United States Patent
Furuya

(10) Patent No.: US 9,635,292 B2
(45) Date of Patent: Apr. 25, 2017

(54) IMAGE PROCESSING APPARATUS AND METHOD FOR CONTROLLING IMAGE PROCESSING APPARATUS

(71) Applicant: CANON KABUSHIKI KAISHA, Tokyo (JP)

(72) Inventor: Kohei Furuya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/630,750

(22) Filed: Feb. 25, 2015

(65) Prior Publication Data

US 2015/0244953 A1 Aug. 27, 2015

(30) Foreign Application Priority Data

Feb. 27, 2014 (JP) ................. 2014-037320

(51) Int. Cl.
*H04N 9/64* (2006.01)
*H04N 5/369* (2011.01)
*H04N 5/367* (2011.01)

(52) U.S. Cl.
CPC ......... *H04N 5/3696* (2013.01); *H04N 5/3675* (2013.01)

(58) Field of Classification Search
None
See application file for complete search history.

(56) References Cited

U.S. PATENT DOCUMENTS

| | | | |
|---|---|---|---|
| 8,208,044 B2 | 6/2012 | Atanassov et al. | |
| 2003/0043286 A1 | 3/2003 | Kato | |
| 2005/0058362 A1 | 3/2005 | Kita | |
| 2010/0026862 A1 | 2/2010 | Nishiwaki | |
| 2010/0066871 A1 | 3/2010 | Atanassov et al. | |
| 2011/0102649 A1 | 5/2011 | Hashizume | |
| 2012/0039545 A1 | 2/2012 | Chen | |

(Continued)

FOREIGN PATENT DOCUMENTS

| | | |
|---|---|---|
| EP | 1594308 A1 | 11/2005 |
| JP | 10-126795 A | 5/1998 |
| JP | 11-220661 A | 8/1999 |

(Continued)

OTHER PUBLICATIONS

Jan. 15, 2016 Japanese Office Action, that issued in Japanese Patent Application No. 2014037320.

(Continued)

*Primary Examiner* — Stephen Coleman
(74) *Attorney, Agent, or Firm* — Cowan, Liebowitz & Latman, P.C.

(57) ABSTRACT

A first area of an image is generated from pixels existing on a line of interest that is set so as to pass through a pixel corresponding to a correction target pixel. Second areas are generated, each second area based on the positions of pixels existing on at least one reference lines that are set so as not to pass through the correction target pixel. The value of the pixel corresponding to the correction target pixel is corrected using a value of a pixel on each of the at least one reference lines, the value being determined based on the amounts of correlation between the respective second areas and the first area. The amounts of correlation are computed while applying a larger weight to a correlation in a portion that is closer to the pixel corresponding to the correction target pixel.

14 Claims, 16 Drawing Sheets

(56) References Cited

U.S. PATENT DOCUMENTS

2013/0208974 A1  8/2013  Nakano et al.

FOREIGN PATENT DOCUMENTS

| | | |
|---|---|---|
| JP | 2005-175547 A | 6/2005 |
| JP | 2005-293361 A | 10/2005 |
| JP | 2014-027373 A | 2/2014 |
| RU | 2412554 C1 | 2/2011 |
| SU | 1385327 A1 | 3/1988 |
| WO | 2011/118329 A1 | 9/2011 |

OTHER PUBLICATIONS

Jan. 15, 2016 Japanese Office Action, that issued in Japanese Patent Application No. 2014037319.

British Search Report issued on Jul. 27, 2015, that issued in the corresponding U.K. Patent Application No. 1502238.7.

Jan. 25, 2016 Russian Office Action, that issued in Russian Patent Application No. 2015106670.

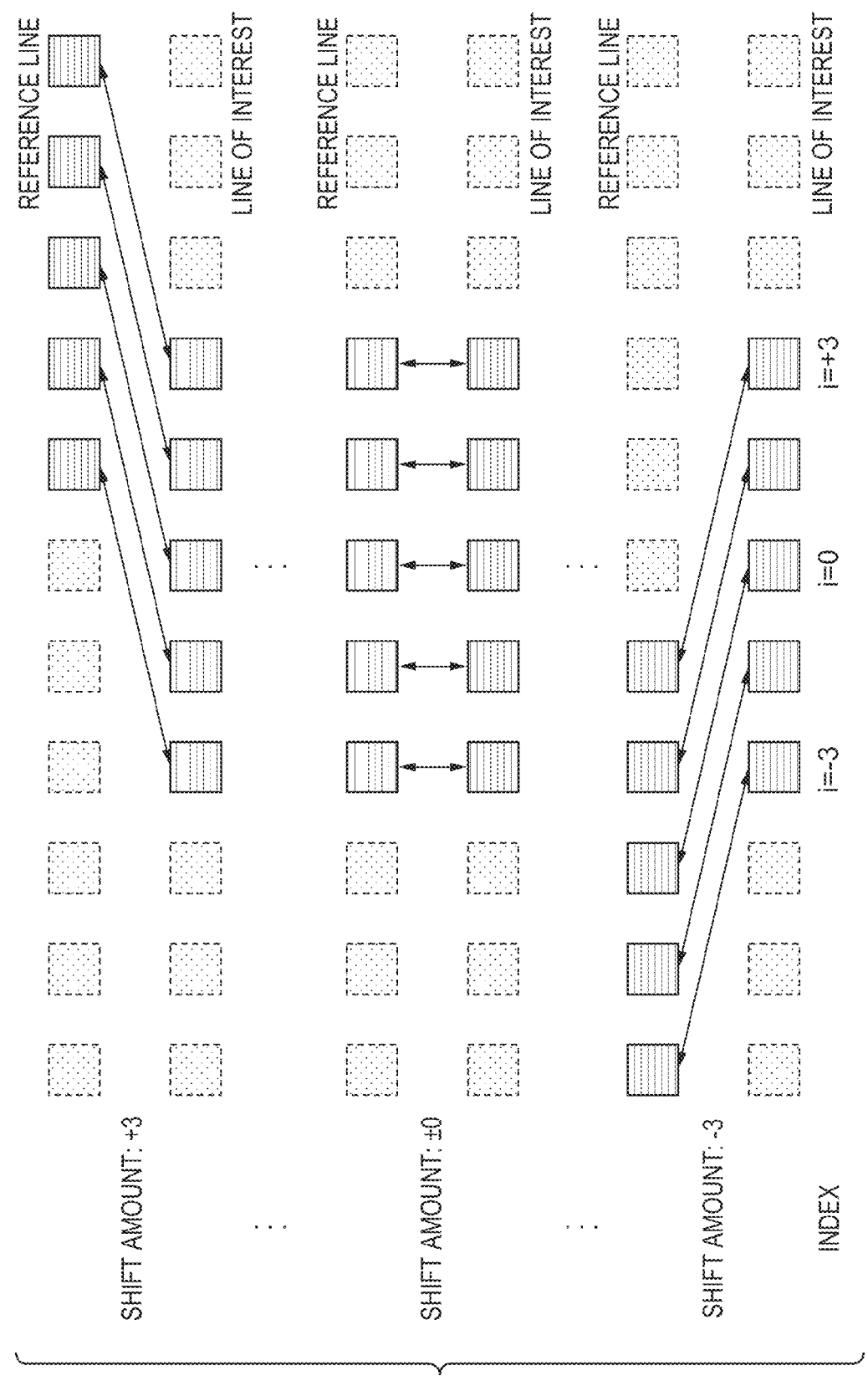

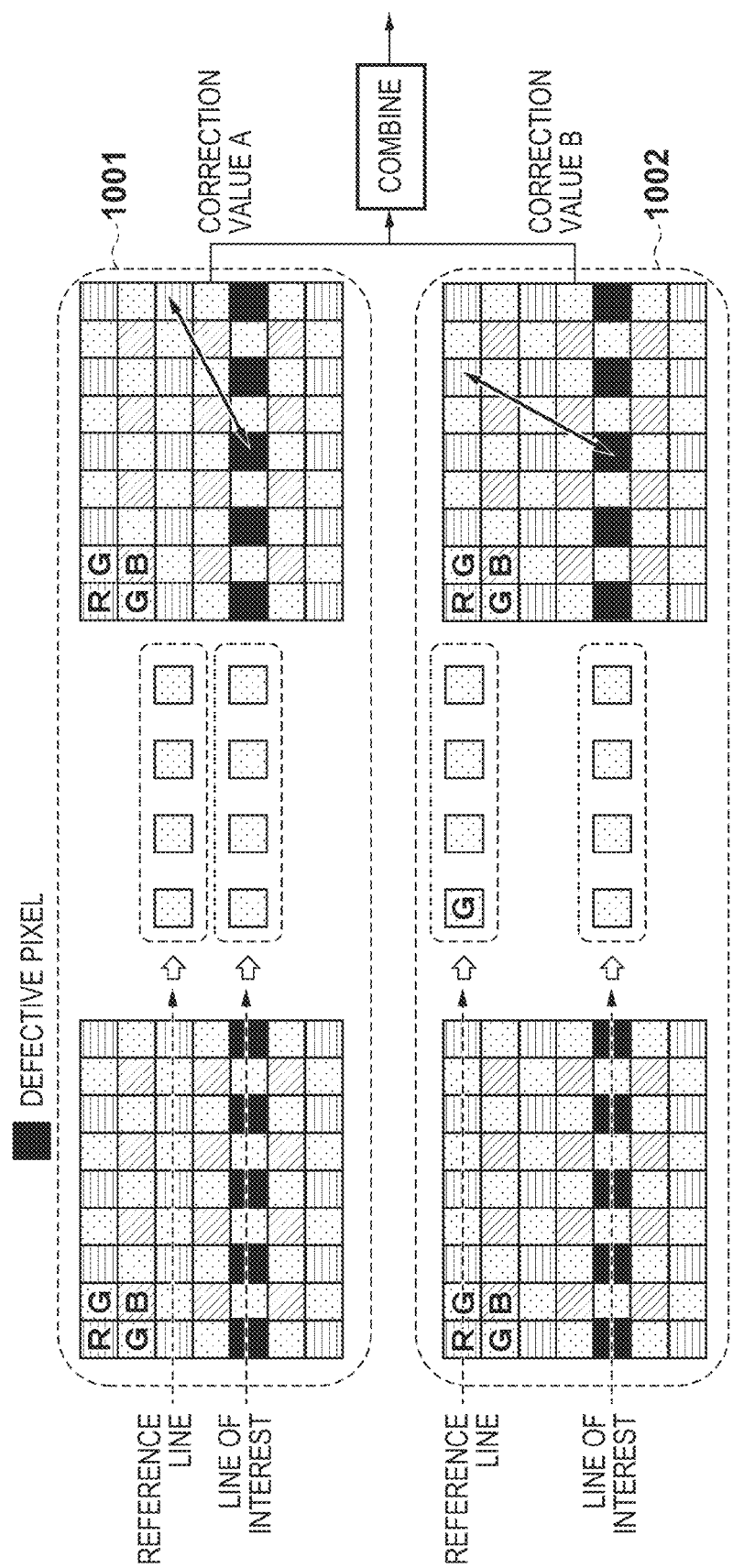

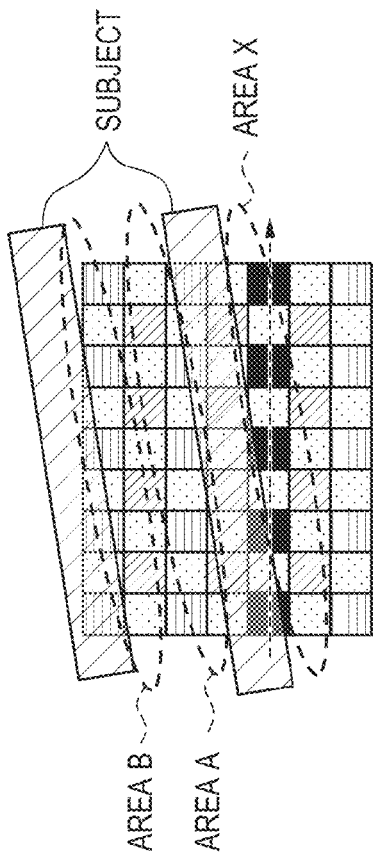
F I G. 12A
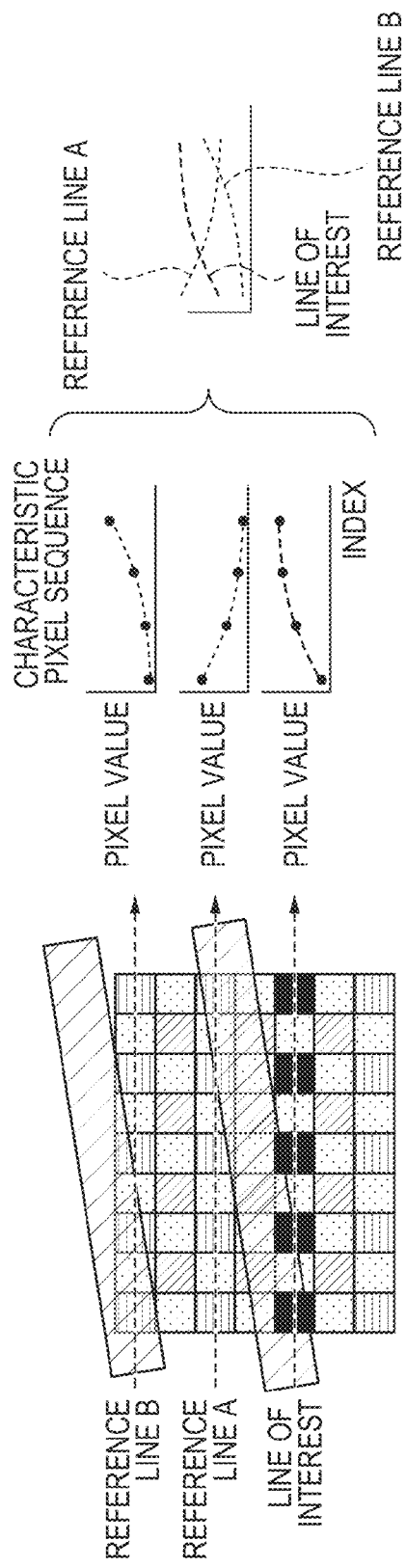
F I G. 12B

FIG. 16A
PRIOR ART
FIG. 16B
PRIOR ART
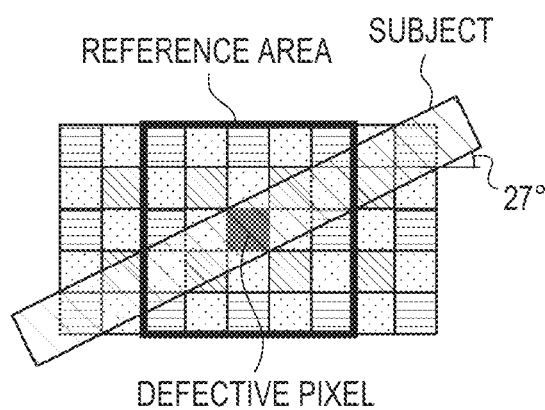
FIG. 16C
PRIOR ART
FIG. 16D
PRIOR ART
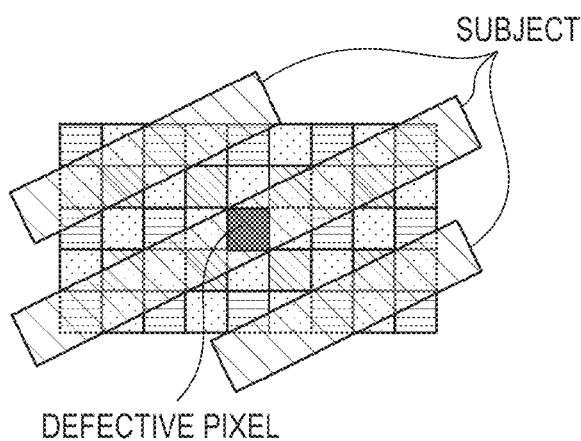

IMAGE PROCESSING APPARATUS AND METHOD FOR CONTROLLING IMAGE PROCESSING APPARATUS

BACKGROUND OF THE INVENTION

Field of the Invention

The present invention relates to an image processing apparatus and a method for controlling the image processing apparatus, and relates in particular to a technique for correcting a defective pixel.

Description of the Related Art

An image capture apparatus such as a digital camera takes an image using an image sensor such as a CMOS sensor. In general, a defective pixel exists in the image sensor since a large number of pixels are provided therein. As a technique for correcting the value of such a defective pixel, a method is known that uses a pixel value estimated from one or more values of one or more non-defective pixels existing at the periphery of the defective pixel, as the pixel value at a defective pixel position. Hereinafter, in the present specification, obtaining a pixel value at the defective pixel position that would have been obtained if the pixel were not defective will be referred to as defective pixel correction.

For example, Japanese Patent Laid-Open No. 11-220661 discloses a method in which values of peripheral pixels of the same color as the defective pixel are referenced, the shape of a subject near the defective pixel is classified into any of predetermined patterns, and the defective pixel is corrected by using peripheral pixels and a method that corresponds to the classified pattern. Japanese Patent Laid-Open No. 2005-175547 discloses a method that uses, when the spatial frequency of a subject near a defective pixel is high, adjoining pixels for detecting a reference direction of a pixel to be used in correction of the defective pixel, thereby realizing more accurate interpolation than in the case of using pixels of the same color as the defective pixel.

However, with the conventional techniques disclosed in the aforementioned patent documents, a defective pixel can be accurately corrected for a subject having a predetermined specific angle, but there are cases where erroneous correction occurs in the case of a subject having a different angle. For example, consider the case where a subject has an angle (here, approximately 27 degrees) that is close to horizontal, as shown in FIG. 16A. In FIG. 16A, a reference area of pixels used in correction of a defective pixel in the conventional techniques is denoted by a thick frame. Assuming that a pixel value at the defective pixel position is the value (0) shown in FIG. 16B, the defective pixel cannot be appropriately corrected with the value (30 or 40) of a pixel of the same color as the defective pixel within the reference area.

It is more likely that a pixel value suitable for correction of the defective pixel is found within the reference area by expanding the reference area. However, if, for example, pixel values of a subject having a repetitive pattern shown in FIG. 16C are as shown in FIG. 16D due to the defective pixel, there are cases where the angle of the subject cannot be correctly detected based on a difference between two points.

SUMMARY OF THE INVENTION

The present invention provides an image processing apparatus, and a method for controlling the image processing apparatus, that realizes appropriate correction of a defective pixel even when a subject containing the defective pixel does not have a specific angle.

According to an aspect of the present invention, there is provided an image processing apparatus comprising: an obtaining unit configured to obtain an image; a first setting unit configured to set, based on a position of a correction target pixel, a first area of the image, the first area including a plurality of pixels on a line of interest that is set so as to pass through the correction target pixel; a second setting unit configured to set a plurality of second areas of the image, each second area based on positions of a plurality of pixels existing on at least one reference lines that are set so as not to pass through the correction target pixel; a correlation computing unit configured to compute amounts of correlation between the respective second areas and the first area; and a correction unit configured to compute a correction value for correcting a value of a pixel corresponding to the correction target pixel by using a value of a pixel on each of the at least one reference lines, the value being determined based on the amounts of correlation, and to correct the value of the pixel corresponding to the correction target pixel by using the correction value, wherein the correlation computing unit computes the amounts of correlation while applying a larger weight to a correlation in a portion that is closer to the pixel corresponding to the correction target pixel.

According to another aspect of the present invention, there is provided a method for controlling the image processing apparatus, the method comprising: an obtaining step of obtaining an image; a first setting step of setting, based on a position of a correction target pixel, a first area of the image, the first area including a plurality of pixels on a line of interest that is set so as to pass through the correction target pixel; a second setting step of setting a plurality of second areas of the image, each second area based on positions of a plurality of pixels existing on at least one reference lines that are set so as not to pass through the correction target pixel; a correlation computing step of computing amounts of correlation between the respective second areas and the first area; and a correction step of computing a correction value for correcting a value of a pixel corresponding to the correction target pixel by using a value of a pixel on each of the at least one reference lines, the value being determined based on the amounts of correlation, and correcting the value of the pixel corresponding to the correction target pixel by using the correction value, wherein, in the correlation computing step, the amounts of correlation are computed while applying a larger weight to a correlation in a portion that is closer to the pixel corresponding to the correction target pixel.

Further features of the present invention will become apparent from the following description of exemplary embodiments with reference to the attached drawings.

BRIEF DESCRIPTION OF THE DRAWINGS

FIG. 4 is a schematic diagram of amount-of-correlation computing processing in the first embodiment.

FIG. 9 is a schematic diagram showing the outline of defective pixel correction in the fourth embodiment.

FIGS. 12A and 12B are diagrams for illustrating the method for combining correction values in the fourth embodiment.

FIGS. 16A to 16D are diagrams showing an example of a subject condition that is difficult to handle with conventional techniques.

DESCRIPTION OF THE EMBODIMENTS

Exemplary embodiments of the present invention will be described in detail in accordance with the accompanying drawings. Each of the embodiments of the present invention described below can be implemented solely or as a combination of a plurality of the embodiments or features thereof where necessary or where the combination of elements or features from individual embodiments in a single embodiment is beneficial.

Note that, although the following embodiments will describe examples in which the present invention is applied to an image capture apparatus, configurations unique to an image capture apparatus, such as functions related to photographing and recording of a photographic image, are not essential for the image processing apparatus according to the present invention. The present invention can be implemented in any electronic device capable of obtaining image data obtained by photographing and information related to a defective pixel in an image sensor used in this photographing. An "image capture apparatus" is not limited to an apparatus whose main function is photographing, such as a digital camera, and means any electronic device having a photographing function.

First Embodiment

Figure 1A:
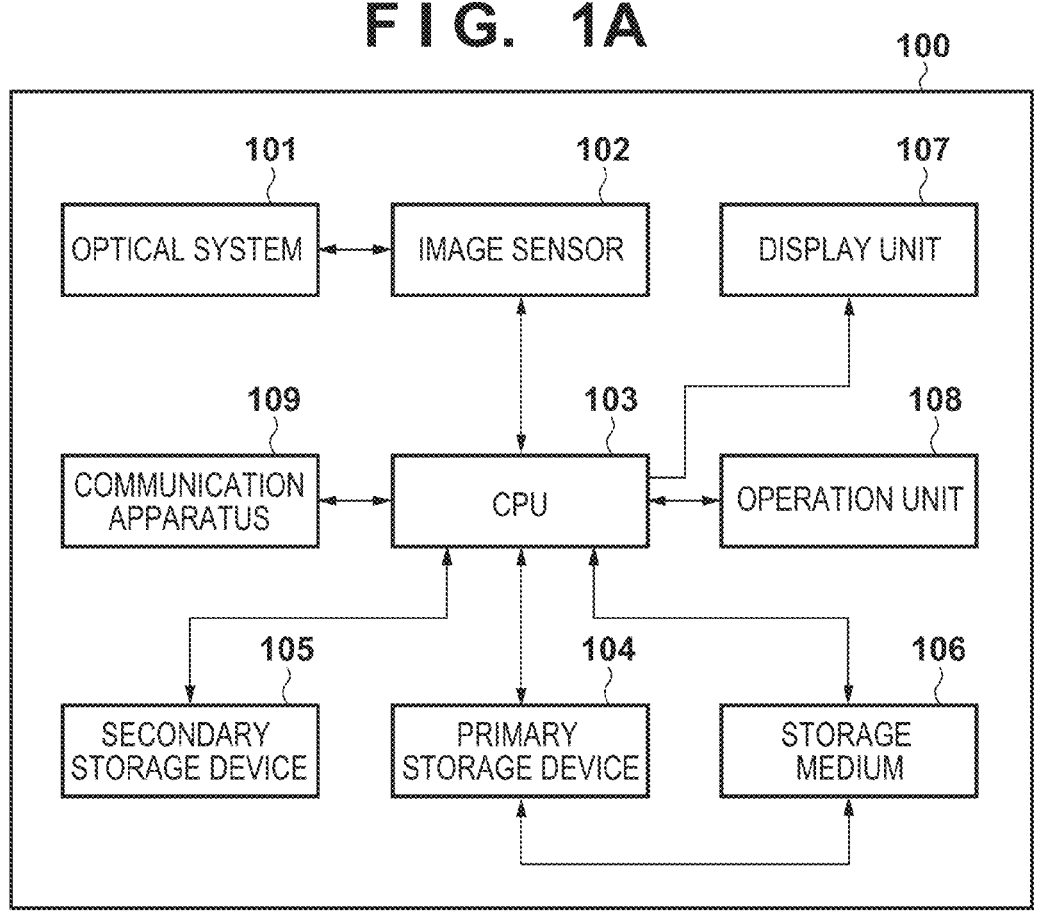
FIGS. 1A and 1B are block diagrams of an image capture apparatus and an information processing apparatus according to embodiments of the present invention.

FIG. 1A is a block diagram showing an exemplary functional configuration of an image capture apparatus (or image processing apparatus) 100, which is an exemplary image processing apparatus according to an embodiment of the present invention.

The image capture apparatus 100 is an apparatus such as a digital camera or a digital video camera that photographs a subject and obtains data (image data) representing an image of the subject. An optical system 101 has a lens, a shutter, and a diaphragm, and forms an optical image of the subject on an image sensor 102, under the control of a CPU 103. The image sensor 102, which may be a CCD or a CMOS image sensor, performs photoelectric conversion on the formed optical image of the subject at each pixel, and converts it into an analog image signal. The CPU 103 converts the analog image signal into a digital image signal (image data), and applies thereto so-called developing processing, such as white balancing adjustment and color interpolation processing, as well as coding processing. The CPU 103 realizes various functions of the image capture apparatus 100 by executing programs and controlling each functional block. Note that at least some of functions described as functions realized as software by the CPU 103 may be realized by hardware (i.e., discrete circuits, an ASIC, programmable logic devices, etc.).

A primary storage device 104 is a volatile storage device such as a RAM, for example, and is used as a temporary data storage area, such as a work area for the CPU 103. A secondary storage device 105 is a nonvolatile storage device such as an EEPROM, for example, and stores programs (firmware) for controlling the image capture apparatus 100, programs executed by the CPU 103, various setting information, and the like.

For example, a storage medium 106, which is a semiconductor memory card, stores the image data obtained by photographing as a data file in a predetermined format. The storage medium 106 can be removed from the image capture apparatus 100, and can also be used with other devices having a function of accessing the storage medium 106, such as a personal computer, for example. That is to say, the image capture apparatus 100 need only have a function of accessing the storage medium 106 and be able to read and write data from/in the storage medium 106.

The display unit 107 is used to display a view finder image at the time of photographing, display a taken image or an image read out from the storage medium 106, and display a user interface for an interactive operation, for example. An operation unit 108 has input devices such as a button, a switch, a lever, and a touch panel, for example, and enables a user to give various instructions to the image capture apparatus 100 and configure settings thereof. Note that a configuration that realizes an input method which does not require a physical operation, such as voice input or eye-gaze input, is also included in the operation unit 108.

A communication apparatus 109 enables the image capture apparatus 100 to transmit and receive control commands and data to/from an external device. The protocol to be used for communication with an external device is not particularly limited, and may be PTP (Picture Transfer Protocol), for example. Note that, for example, the communication apparatus 109 may communicate with an external device by means of wired connection using a USB (Universal Serial Bus) cable or the like, or may communicate with an external device by means of wireless connection using a wireless LAN or the like. The communication apparatus 109 may be directly connected to an external device, or may be connected via a server or via a network such as the Internet.

Figure 2:
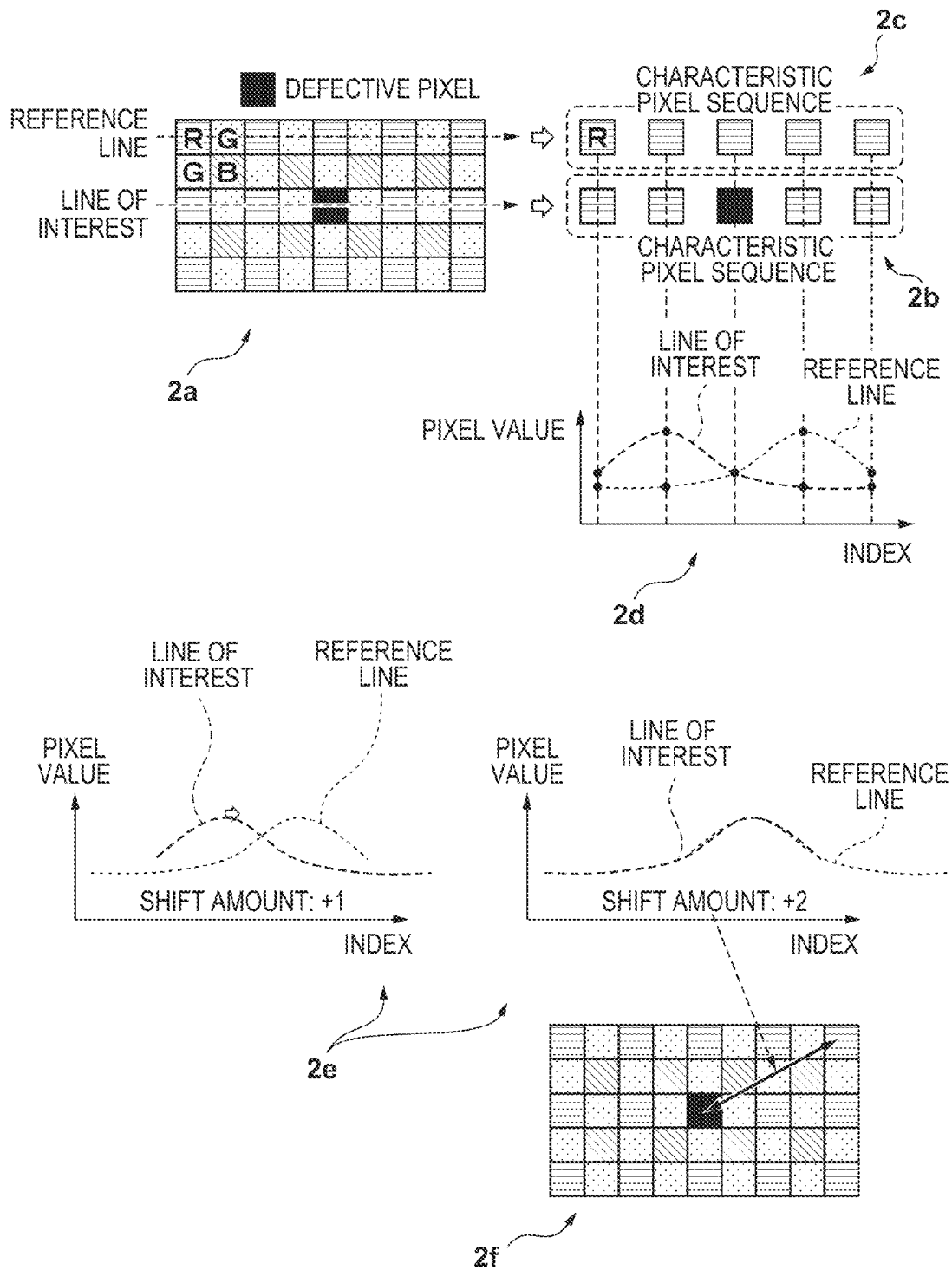
FIG. 2 is a diagram showing an exemplary pixel array in an image sensor in the embodiments.

In FIG. 2, part 2a shows an exemplary pixel array in the image sensor 102 in the present embodiment. The image sensor 102 has a color filter having a primary color Bayer array. Specifically, it has an array with a repetition unit constituted by four pixels that are two horizontal pixels×two vertical pixels. In the repetition unit, the upper left pixel is a red (R) pixel, the upper right and lower left pixels are green (G) pixels, and the lower right pixel is a blue (B) pixel. Although part 2a shows pixels in a very small portion with a defective pixel at the center, the other portion also has the same array. Note that, although the image sensor has the "defective pixel", pixels in the image sensor and pixels of an image obtained by photographing are in a correspondence relationship, and accordingly the pixel in an image corresponding to the defective pixel will also be called a "defective pixel" in the following description. Furthermore, a defective pixel may be referred to as a correction target pixel.

Next, the outline of a defective pixel correction operation in the present embodiment will be described. It is assumed here that an R pixel is a defective pixel, as shown in part 2a of FIG. 2. Initially, when an image shown in part 2a is obtained, a plurality of pixels that include the defective pixel that is to be a correction target and represent a characteristic of a line (line of interest) passing through the defective pixel are extracted from this line, and a characteristic pixel sequence shown in part 2b constituted by the extracted pixels is generated. Here, an example is shown in which the line of interest is a horizontal line, and pixels of the same color as the defective pixel that are located on the same horizontal coordinate as the defective pixel are extracted to generate the characteristic pixel sequence. Note that, although a description is given here of an example of extracting, as characteristic pixels, the defective pixel and two pixels of the same color as the defective pixel that are located in the front and rear of the defective pixel on the line of interest, the method for extracting the characteristic pixels is not limited thereto.

Next, a plurality of pixels representing a characteristic of another line (reference line) parallel with the line of interest are extracted from pixels existing on this line, and a characteristic pixel sequence shown in part 2c constituted by the extracted pixels is generated. Here, an example is shown in which the reference line is set two pixels above the line of interest, and pixels of the same color as the defective pixel are extracted from among pixels on the reference line to generate the characteristic pixel sequence. Since the amount of correlation is computed as described later, the number of characteristic pixels extracted from the reference line is larger than the number of characteristic pixels extracted from the line of interest.

Note that, in the present embodiment, the reference line is set such that pixels of the same color as the defective pixel exist on a line. Accordingly, in the case where the repetition unit is constituted by two pixels, such as an R pixel and a B pixel in a Bayer array, the reference line is set such that the distance thereof from the line of interest is a multiple (2n [pixels.], where n is an integer that is 1 or larger) of the repetition unit.

An example of the respective pixel values of the characteristic pixel sequences generated from the line of interest and the reference line and waveforms generated from the pixel values of the characteristic pixel sequences is shown in part 2d. After thus generating two waveforms from the characteristic pixel sequences on the line of interest and the reference line, the amount of correlation is obtained with regard to a plurality of relative positions (shift amounts), thereby obtaining the shift amount and the direction with which the correlation between the two waveforms is highest.

For example, it is assumed that, as a result of shifting the waveform of the characteristic pixel sequence on the line of interest by +2 (i.e., by two pixels in the rightward direction), the correlation thereof with the waveform of the characteristic pixel sequence on the reference line becomes highest, as shown in part 2e. Since the characteristic pixel sequence is constituted by the same color pixels in a Bayer array, the shift amount (+2)×2 corresponds to the difference in pixel coordinates in the original pixel array. Accordingly, it is found that the pixel on the reference line that is most correlated with the defective pixel is located +4 away from the defective pixel on the horizontal coordinate (i.e., 4 pixels away therefrom in the rightward direction), as shown in part 2f.

For this reason, in the easiest method, the defective pixel can be corrected by using, as the value of the defective pixel, the value of the pixel that is most correlated with the defective pixel, for example.

Next, a description will be given, using a flowchart shown in FIG. 3, of how to realize the above-described defective pixel correction in the present embodiment with the image capture apparatus 100 shown in FIG. 1A.

Initially, in step S301, the CPU 103 obtains image data that is a processing target. Here, the image data may be obtained by photographing, or may be obtained by reading out image data recorded in the storage medium 106. Alternatively, it may be obtained from an external device via the communication apparatus 109. Note that the image data obtained here is in a state where the defective pixel has not been corrected, and is RAW image data, for example.

The CPU 103 loads the obtained image data in the primary storage device 104, for example. The CPU 103 then scans each pixel of the image data, while applying processing in steps S302 to S307 on a pixel of interest that is a defective pixel according to the determination in step S302. Note that, although it is determined in step S302 whether or not each pixel of interest of the image data is a defective pixel in the example in FIG. 3, processing in steps S303 to S307 may be sequentially performed on the defective pixel using position information of the defective pixel.

The information of the defective pixel may be defective pixel information that is stored in the secondary storage device 105 at the time of manufacturing the image capture apparatus 100, for example. Also, for example, a defective pixel in the image sensor 102 may be detected from an image taken under a specific condition, such as when starting the image capture apparatus 100, and position information thereof may be stored in the secondary storage device 105. At this time, the information stored at the time of manufacturing may be updated with defective pixel information obtained by subsequent detection processing. The defective pixel information may be recorded as additional information on the image data.

A description will now be given of processing in step S303 and subsequent steps performed on a pixel that is a defective pixel according to the determination. In step S303, the CPU 103 generates the characteristic pixel sequence (first pixel sequence) on the line of interest. For example, this step may be processing for extracting pixels of the same color as the defective pixel that exist on the same horizontal coordinate as the defective pixel and generating the characteristic pixel sequence, as described using part 2b in FIG. 2. Note that extraction of the characteristic pixels may be performed using other methods, as described in other embodiments.

Next, in step S304, the CPU 103 generates the characteristic pixel sequence (second pixel sequence) on the reference line. Here as well, this step may be processing for extracting pixels of the same color as the defective pixel that are located on the reference line which is set two pixels above the line of interest and generating the characteristic pixel sequence, as described using part 2c in FIG. 2, for example.

In step S305, the CPU 103 detects the shift amount with which the correlation is largest, while changing the relative positions of the characteristic pixel sequences generated from the line of interest and the reference line, in order to determine the pixel value that is suitable to be referenced for defective pixel correction.

A specific example of the amount-of-correlation computing processing in step S305 will be described using FIG. 4.

In this embodiment, an amount of correlation is computed between the characteristic pixel sequence on the line of interest and a part of the characteristic pixel sequence on the reference line (an area in the reference line) having the same number of pixels as that of the characteristic pixel sequence on the line of interest. Whenever a shift amount between the sequences changes, a different area of the characteristic pixel sequence on the reference line is used to calculate an amount of correlation for the shift amount. Therefore, the characteristic pixel sequence on the reference line can be considered as being comprised of a plurality of pixel areas.

FIG. 4 schematically shows an example of computing the amount of correlation at the time of shifting the characteristic pixel sequence on the reference line by X pixels (X is an integer, indicates the rightward direction when positive, and indicates the leftward direction when negative) with respect to the characteristic pixel sequence on the line of interest. The CPU 103 sums up differences between pixel values connected by respective arrows, with each shift amount (relative position). For example, assume that the number of pixels regarding which correlation is computed is 2W+1 (W is a positive integer), the pixel value at an index i (see FIG. 4) of the characteristic pixel sequence on the line of interest is Ti, and the pixel value at the index i of the characteristic pixel sequence on the reference line is Ri. At this time, the amount of correlation Sx at the time of the shift amount X is computed by the following equation.

$$S_X = \sum_{i=-W}^{W} |T_i - R_{i+X}| \quad (1)$$

That is to say, a smaller amount of correlation Sx represents higher correlation. Note that, in the method described so far, the characteristic pixels including the defective pixel are extracted from the line of interest to generate the characteristic pixel sequence. For this reason, the value of the defective pixel (T0) cannot be used in computing a correlation value. Accordingly, only when i=0, the amount of correlation Sx is obtained with the amount of correlation to be added in Equation (1) being 0, for example.

It is possible to determine the position of a reference pixel for correcting the defective pixel, from the shift amount X with which the smallest correlation value Sx is obtained, among correlation values Sx computed with regard to a plurality of shift amounts within a predetermined range. For example, if the amount of correlation Sx is the smallest value when the shift amount X=+2, it is determined that, among the pixels of the same color as the defective pixel, the pixel located two pixels rightward thereof (i.e., located on the reference line four pixels rightward of the defective pixel) is the reference pixel.

Figure 5A:
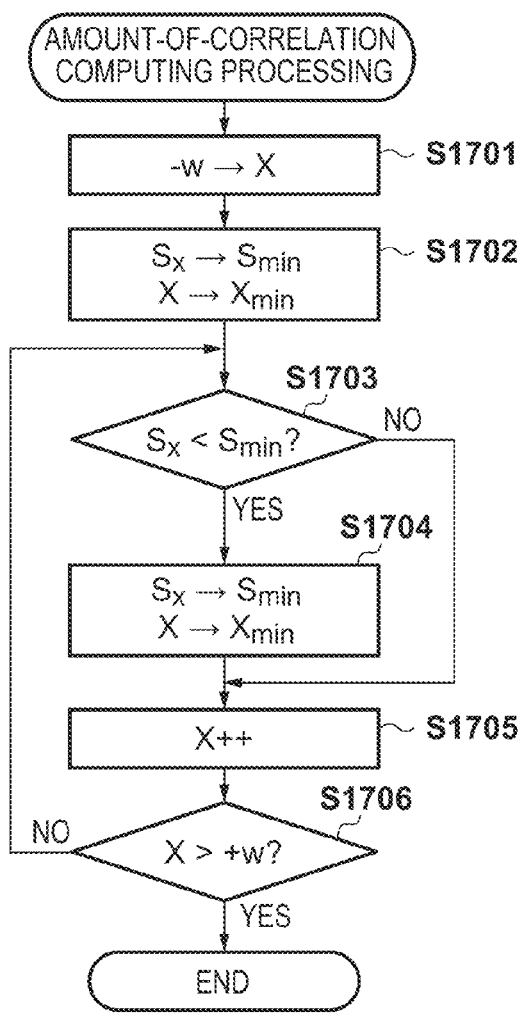
FIGS. 5A and 5B show specific examples of the amount-of-correlation computing processing in the embodiments.

FIG. 5A is a flowchart showing a specific example of the amount-of-correlation computing processing in step S305. Initially, in step S1701, the CPU 103 substitutes −W, which serves as a start index, for X, and thereafter, in step S1702, initializes the smallest amount of correlation Smin and the shift amount Xmin at the time of the smallest amount of correlation. Thereafter, the CPU 103 executes processing in steps S1703 to S1706, while incrementing X in step S1705.

In step S1703, the CPU 103 determines whether or not the computed amount of correlation Sx is smaller than the smallest amount of correlation Smin at this time point, advances the processing to step S1704 if Sx<Smin, and advances the processing to step S1705 if Sx≥Smin. Note that, when the amount of correlation Sx is computed for the first time (here, in the case where X=−W), the CPU 103 advances the processing to step S1704.

In step S1704, the CPU 103 updates the smallest amount of correlation Smin with the current amount of correlation Sx. The shift amount Wmin corresponding to the smallest amount of correlation Smin is also updated with the current value of X. Then, in step S1705, the CPU 103 increments X, and in step S1706, the CPU 103 determines whether or not the processing has been performed for the overall shift range. The CPU 103 ends the processing if the processing has been performed for the overall shift range, and returns the processing to step S1703 if there is data that has not yet been subjected to the processing. With the above-described processing, it is possible to obtain the smallest amount of correlation Smin within the shift range and the shift amount Wmin with which the smallest amount of correlation can be obtained.

Note that the method for the amount-of-correlation computing processing shown in FIG. 5A is merely an example, and any other method with which a similar result can be obtained may be used. For example, the shift amount X does not necessarily have to be incremented from the smallest value, and the values may be changed in any order as long as a correlation value corresponding to each shift amount can be computed. Also, all correlation values corresponding to the respective shift amounts may be stored, and the shift amount corresponding to the smallest correlation value may be selected lastly.

After the position of the reference pixel is thus determined based on the amount of correlation of the characteristic pixel sequence, the CPU 103 computes a correction value in step S306. In the simplest case, the correction value may be the value of the reference pixel, but the correction value may be computed using other methods. For example, the defective pixel may be corrected using a feature amount such as a color difference computed from the value of the reference pixel and the values of peripheral pixels of the reference pixel.

After computing the correction value in step S306, in step S307 the CPU 103 corrects the defective pixel using the correction value. Thereafter, the CPU 103 determines in step S308 whether or not pixel scanning has finished, and repeatedly executes steps S302 to S307 until the scanning finishes.

Note that, although the present embodiment has described an example of setting the line of interest and the reference line in the horizontal direction, there is no limitation on the angle at which the line of interest and the reference line are set, and the line of interest and the reference line may be set in any direction, such as in the vertical direction or in an oblique direction.

Although the present embodiment sets the reference line two pixels above the line of interest that passes through the defective pixel, the reference line may be set at other distances or in other directions. For example, the reference line may be set two pixels below the line of interest, or the reference lines may be set two pixels above and below the line of interest, respectively, or the correction values computed from the reference pixels determined on the respective reference lines may be averaged. By thus setting a plurality of reference lines in a direction (vertical direction) orthogonal to the line of interest and using the correction values computed on the respective reference lines, it is possible to perform accurate interpolation that also reflects a change in a signal level in the vertical direction. Many reference lines can be set near the line of interest and accurate interpolation can be performed when setting the reference lines on both sides of the line of interest, as compared with the case of setting a plurality of reference lines on one side of the line of interest.

Furthermore, although the present embodiment has described an exemplary case where an R pixel in a Bayer array is a defective pixel, the present invention is similarly applicable even if the defective pixel is a B pixel or a G pixel.

As described above, according to the present embodiment, the reference pixel is determined based on the amount of correlation between the line of interest including the defective pixel and the reference line. For this reason, the reference pixel suitable for correction of the defective pixel can be determined regardless of the shape of a subject. Furthermore, an ill effect of erroneous correction can be reduced, while expanding the reference area.

Second Embodiment

The first embodiment has described the correction method in the case where the defective pixel is a pixel of a color that appears once in each repetition unit of the color filter, such as an R pixel or a B pixel in a Bayer array. The present embodiment relates to a correction method in the case where the defective pixel is a pixel that appears in each pixel line, such as a G pixel in a Bayer array.

In the case where an R pixel or a B pixel in a Bayer array is a defective pixel, since the repetition unit is constituted by two pixels, a pixel of the same color as the defective pixel does not exist in an adjoining pixel line and is located at a position separated from the defective pixel by at least two pixels, and therefore the reference line is set on a pixel line separated from the line of interest by two pixels. However, for example, if a G pixel is a defective pixel as shown in part 6a of FIG. 6, a pixel of the same color as the defective pixel exists on an adjoining pixel line. For this reason, the reference line can be set on a pixel line that is parallel with the line of interest and is separated therefrom by one pixel, as shown in part 6c of FIG. 6.

If the reference line can be thus set on the adjoining pixel line, the amount of correlation can be more accurately computed than in the case of setting the reference line on a pixel line separated by two pixels, since the distance between the line of interest and the reference line is shorter. However, since the coordinates of G pixels on adjoining pixel lines are shifted from each other by one pixel in a Bayer array, this shift needs to be considered when obtaining the reference pixel position using the shift amount X with which the correlation between the characteristic pixel sequences is highest (i.e., the correlation value Sx is smallest).

Figure 6:
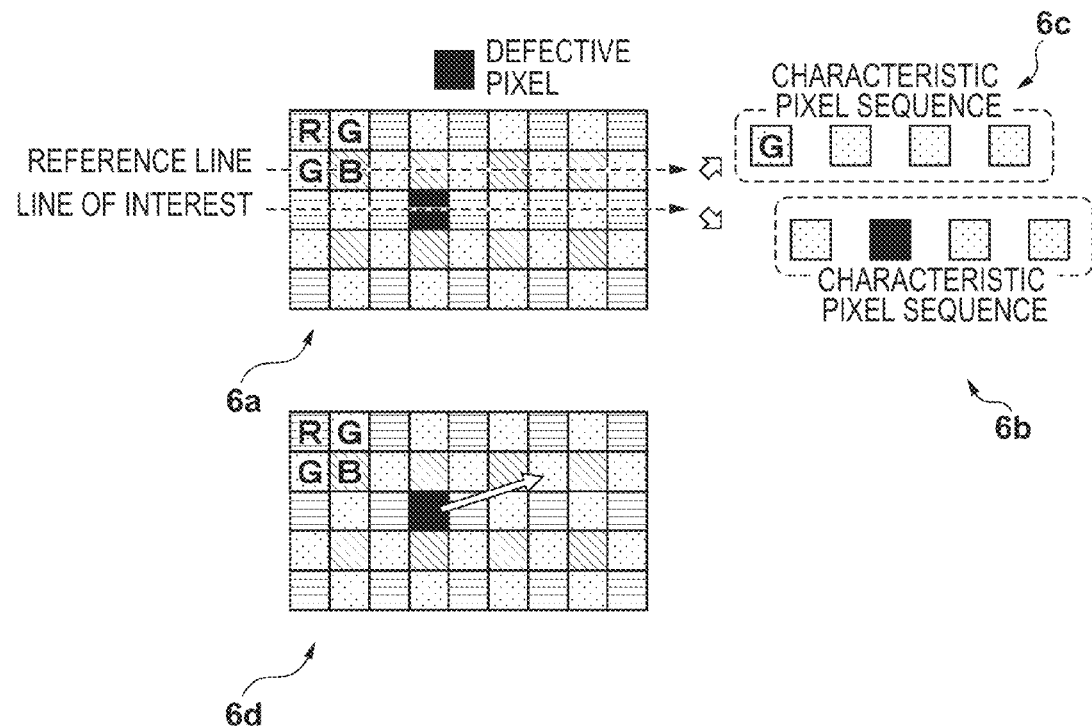
FIG. 6 is a schematic diagram showing a setting of a reference line in a second embodiment.

For example, if the characteristic pixel sequences are generated as shown in parts 6b and 6c in FIG. 6, the pixel corresponding to the defective pixel with the shift amount 0 is a pixel whose horizontal coordinate is smaller than the defective pixel (i.e., leftward thereof) by one pixel on the reference line. Accordingly, if the shift amount X is obtained, it is determined that the pixel on the reference line whose horizontal coordinate is shifted from the defective pixel by (X×2−1) is the reference pixel. For example, if the correlation is highest when the shift amount X=2, it is determined that the pixel on the reference line separated from the horizontal coordinate of the defective pixel by (2×2−1)=+3 pixels, i.e., the pixel separated therefrom rightward by three pixels is the reference pixel, as shown in part 6d of FIG. 6.

According to the present embodiment, the defective pixel can be more accurately corrected when a pixel of the same color as the defective pixel exists on an adjoining pixel line. Note that the color of the defective pixel may be stored in association with the position information of the defective pixel, or may be calculated using information stored separately from the position information. Note that the information of the color arrangement pattern of the color filter provided in the image sensor used in photographing may be stored in the secondary storage device 105, or may be obtained from additional information of image data, for example. Accordingly, the first embodiment and the present embodiment can be configured to be selectively executed depending on the color arrangement pattern of the color filter and the color of the defective pixel.

Third Embodiment

The first and second embodiments have described the correction method in the case where the defective pixel is isolated. The present embodiment will describe a correction method in the case where defective pixels of the same color successively exist. Such defective pixels occur due to manufacturing tolerance or aged deterioration, as well as in the case where pixels for focus detection are arranged in the image sensor as shown in part 7a of FIG. 7. Since the focus detection pixels generate a signal for performing focus detection in a phase difference detection method, their range of light reception is narrower than usual pixels, or the color filter is not provided therein, and consequently an obtained pixel value is different from that of usual pixels. Accordingly, correction needs to be performed by considering these focus detection pixels to be successive defective pixels of the same color, as shown in part 7b of FIG. 7.

Assuming that the line of interest is in the horizontal direction as in the above embodiments, the method described in the first embodiment cannot be used in which the characteristic pixel sequence is generated using the defective pixel and the pixels of the same color as the defective pixel that exist on the line of interest.

In the present embodiment, characteristic pixel sequences on the line of interest and the reference line are generated using a different method from the above embodiments. Specifically, in the processing for generating the characteristic pixel sequence on the line of interest in step S303 in FIG. 3, the CPU 103 extracts, as the characteristic pixels, pixels on the same horizontal coordinate of a color which is "different" from the defective pixel as the defective pixel, as in part 7c of FIG. 7. Here, since a Bayer array color filter is used and the defective pixel is an R pixel, G pixels are extracted from the line of interest to generate the characteristic pixel sequence.

Figure 7:
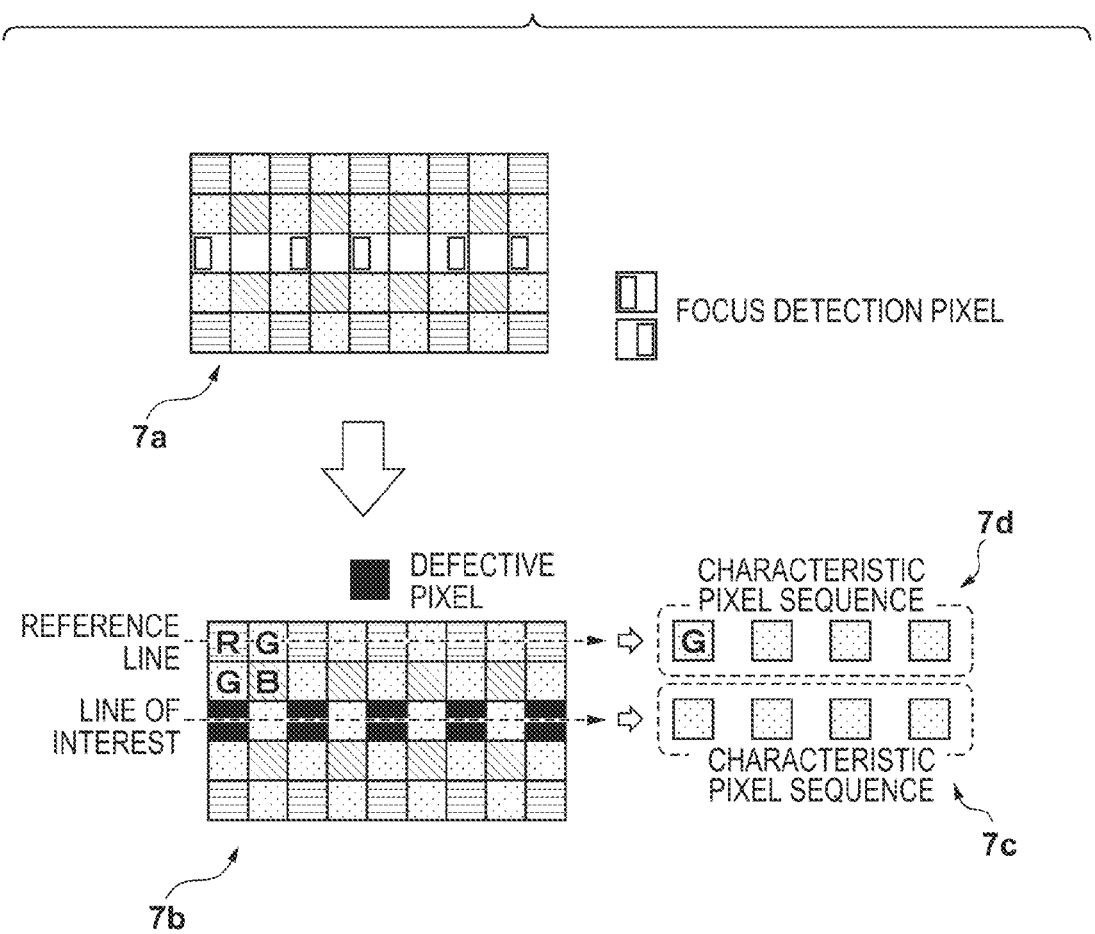
FIG. 7 is a schematic diagrams for illustrating a third embodiment.

Also, since the defective pixel is an R pixel, the CPU 103 sets the reference line at a position separated (here, above) by two pixels, which constitutes the repetition unit of the color filter, as in the first embodiment. Then, in step S304, the CPU 103 extracts, as the characteristic pixels, pixels on the reference line of a color "different" from the defective pixel to generate the characteristic pixel sequence, as with the line of interest shown in part 7d(FIG. 7). Since the color arrangement of the color filter on the reference line is identical with the line of interest, the same G pixels are extracted from the reference line to generate the characteristic pixel sequence, as with the line of interest.

After the shift amount with which the amount of correlation between the characteristic pixel sequences is smallest is detected, correction is performed by using, as the reference pixel, the pixel at the position separated from the defective pixel by this shift amount. Since the reference pixel is determined while regarding the position of the defective pixel as the shift amount 0, the reference pixel is a pixel of the same color as the defective pixel.

Note that, in the case where pixels of a color that exist on an adjoining pixel line, such as G pixels in a Bayer array, are successively defective pixels, the reference line is set such that the characteristic pixel sequences on the line of interest and the reference line are constituted by the same color pixels.

Also, although the characteristic pixel sequences are generated using values of pixels of a color different from the defective pixel as-is in the present embodiment, an average pixel value of a plurality of pixels including adjoining pixels may be used, for example.

As described above, in the present embodiment as well, the same effect as that in the above-described embodiments can be realized.

Note that, although a description has been given here of correction performed using pixels of a color different from defective pixels when the defective pixels of the same color successively exist, the same correction as in the present embodiment may be executed also in the case of correcting an isolated defective pixel. For example, the first embodiment may be configured such that G pixels on the line of interest and the reference line are extracted as the characteristic pixels.

Fourth Embodiment

The above embodiments have described the case where the reference pixel is obtained from the reference line that is set on a pixel line that is separated from the line of interest in the vertical direction by one repetition unit of the color filter, or on a pixel line that adjoins the line of interest. That is to say, it is the case where the line of interest and the reference line are significantly correlated in the horizontal direction.

Figure 8A:
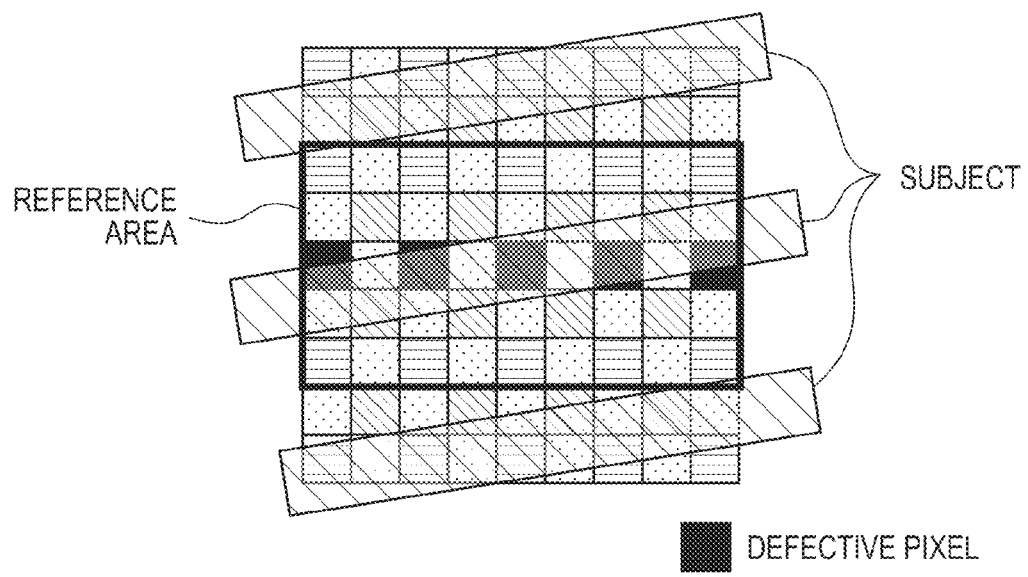
FIGS. 8A and 8B are schematic diagrams for illustrating a fourth embodiment.

However, in the case of a subject shown in FIG. 8A that has a repetitive pattern having an angle close to horizontal, a pixel line that is separated from the line of interest in the vertical direction by one repetition unit of the color filter or that adjoins the line of interest is not significantly correlated. Note that, although FIG. 8A shows the case where defective pixels successively exist as in the third embodiment, the same problem may occur in the case of an isolated defective pixel.

In the case of thus using the line of interest included in a subject having an angle close to horizontal and the reference line that is not included in the subject, even if the amount of correlation is obtained by shifting the characteristic pixel sequence in the horizontal direction, it is unlikely to be able to determine an appropriate reference pixel unless the shift amount is varied in a significantly wide range. If the defective pixel is corrected using an inappropriate reference pixel, erroneous correction occurs which results in a pixel value that is greatly different from the original pixel value. In particular, with a subject having a repetitive shape, erroneous correction repeatedly occurs, and a repetitive pattern that the subject does not originally have is generated.

Figure 8B:
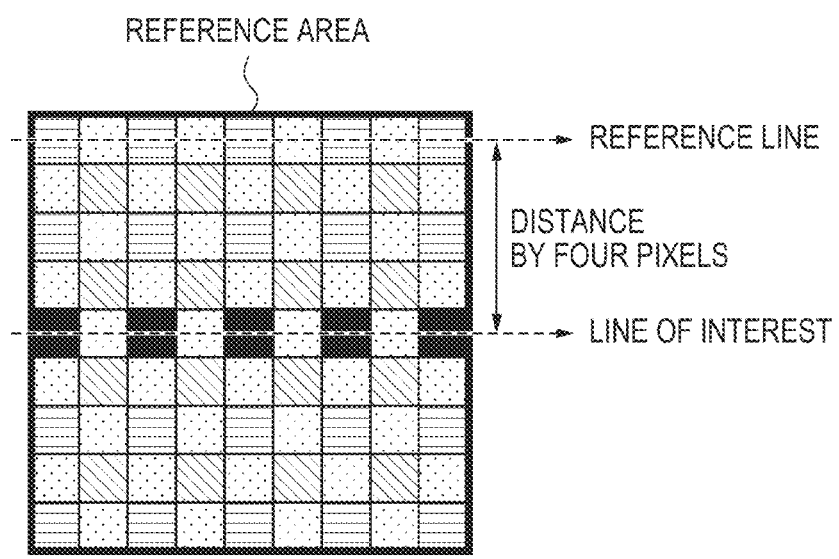

In the case where the defective pixel is included in the subject having a repetitive shape with an angle close to horizontal as shown in FIG. 8A, an appropriate reference pixel (a pixel having a value that is the same as or close to the defective pixel) is easier to find by expanding the vertical search area, rather than expanding the horizontal search area. However, if the search area is simply expanded in the vertical direction, the distance between the line of interest and the reference line increases as shown in FIG. 8B, and accordingly there are cases where the accuracy of the amount of correlation between the characteristic pixel sequences decreases. For example, such cases include the case where a subject different from that in the defective pixel appears in a pixel at the position separated from the defective pixel in the vertical direction by four pixels. In this case, erroneous correction may possibly be performed on the defective pixel as a result of referencing a pixel value of the different subject. The present embodiment provides a correction method that can suppress erroneous correction, while expanding the reference area in the vertical direction.

FIG. 9 is a diagram schematically showing the outline of defective pixel correction in the present embodiment. Processes 1001 and 1002 indicate processing for determining the reference pixel using reference lines A and B with different distances from the line of interest, in the same manner as the third embodiment. In process 1001, the pixel line two pixels above the line of interest is set as the reference line A, and in process 1002, the pixel line four pixels above the line of interest is set as the reference line B. An ultimate correction value is obtained using the reference pixel determined on each reference line, and is used in correction of the defective pixel.

Figure 3:
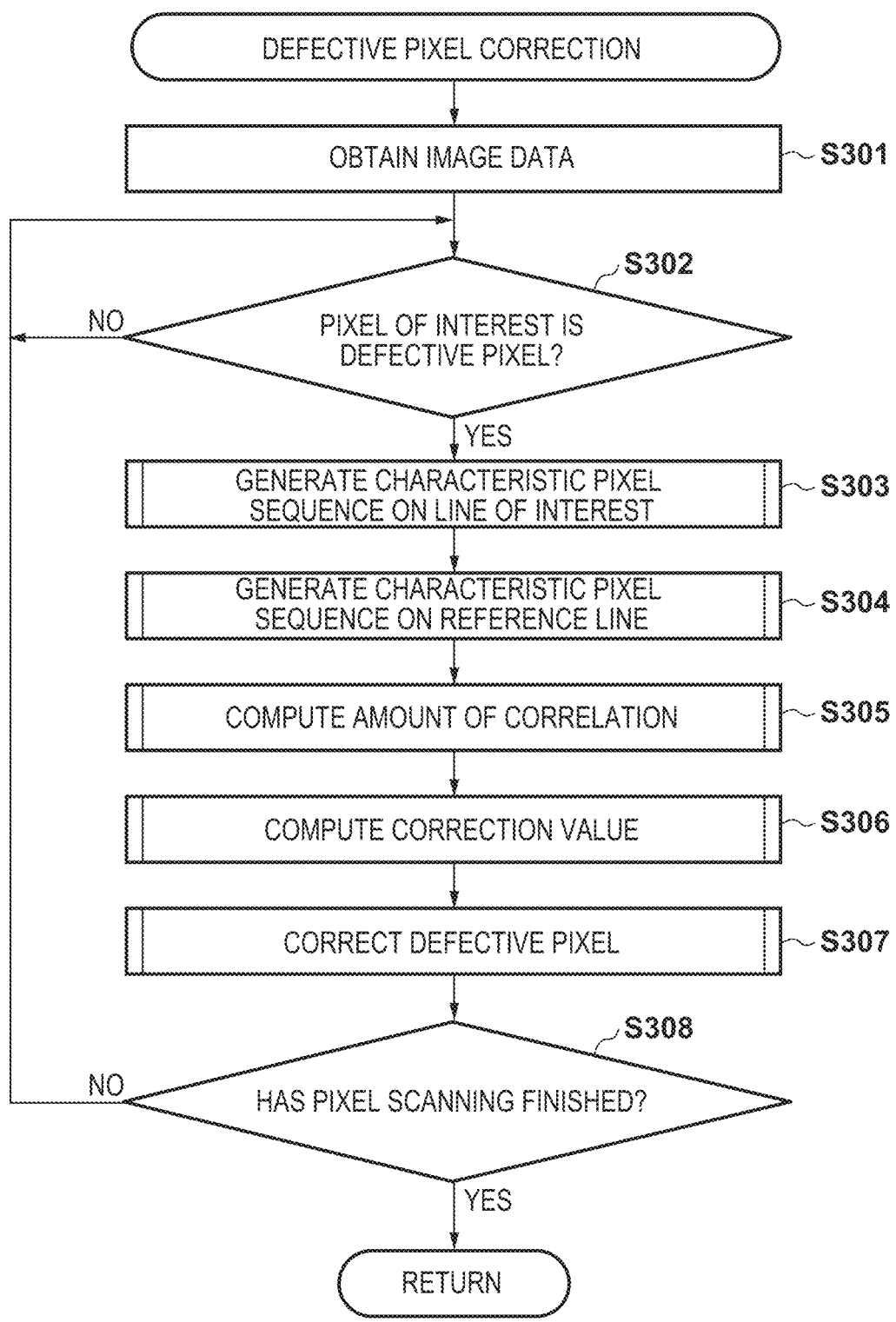
FIG. 3 is a flowchart showing defective pixel correction processing in a first embodiment.
Figure 10:
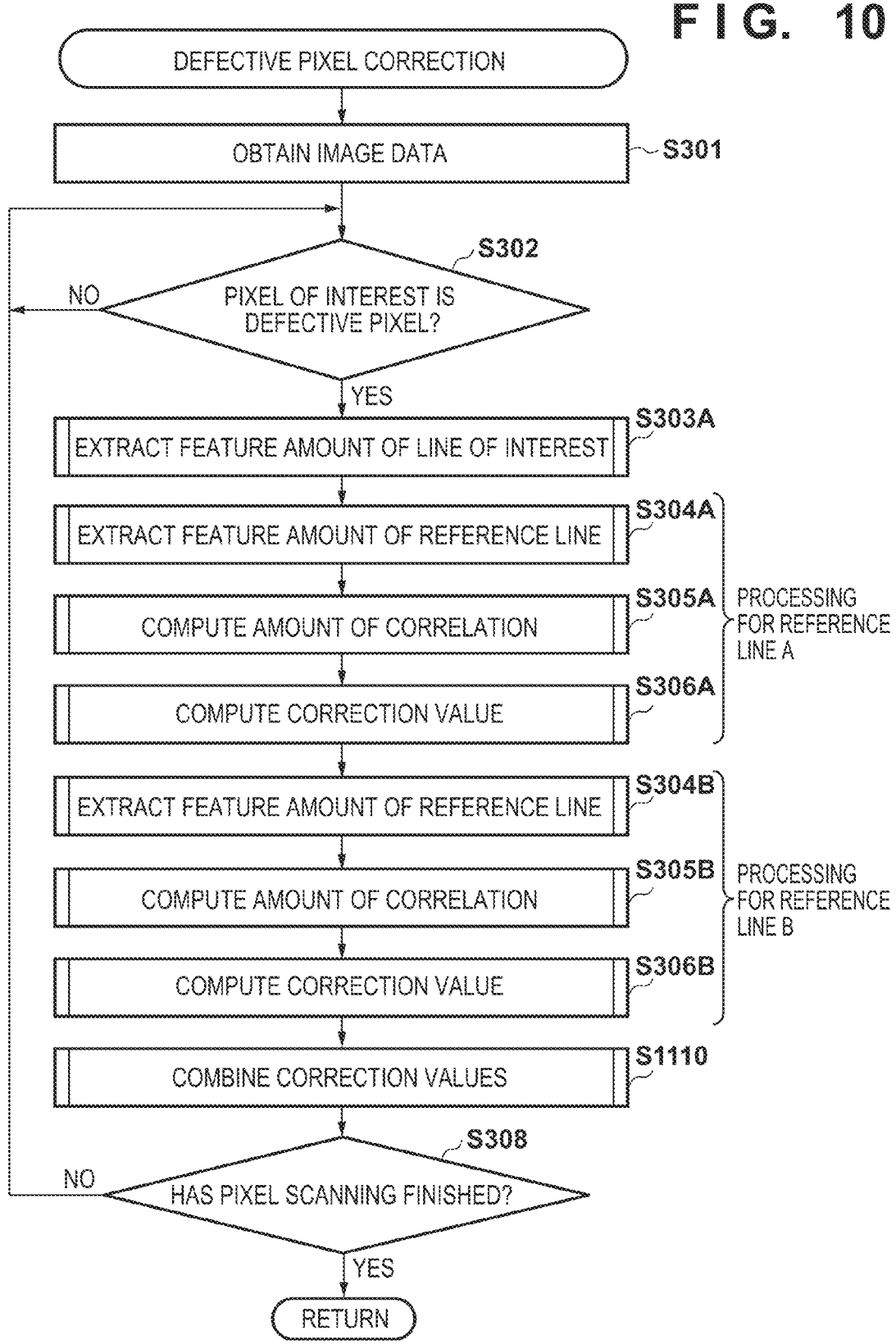
FIG. 10 is a flowchart showing defective pixel correction processing in the fourth embodiment.

FIG. 10 is a flowchart showing a flow of the processing in the present embodiment, and the same reference numerals are given to the same processes as those in FIG. 3. As is clear from comparison between FIGS. 3 and 10, the processing in the third embodiment (in the case where the defective pixel is isolated, the first embodiment) is executed individually on the reference lines A and B, and the obtained correction values are combined to obtain the correction value of the defective pixel.

The feature of the present embodiment lies in combining, in step S1110, the correction values computed with regard to each of the different reference lines. In step S1110, the CPU 103 combines a correction value Qa computed from the reference line A and a correction value Qb computed from the reference line B. Here, assuming that the combining ratio is $\alpha$ ($0 \leq \alpha \leq 1$), an ultimate correction value Q is computed by the following equation.

$$Q = \alpha \times Qa + (1-\alpha) \times Qb \quad (2)$$

Next, three examples using different evaluation criteria as methods for determining the combining ratio $\alpha$ will be described.

Firstly, determination of the combining ratio $\alpha$ in accordance with the smallest amount of correlation will be described. In this case, the combining ratio $\alpha$ is determined using the amount of correlation obtained in the amount-of-correlation computing processing in steps S305A and S305B, in accordance with the magnitude of the difference between the smallest amount of correlation Sa on the reference line A and the smallest amount of correlation Sb on the reference line B. Assuming the difference in the smallest amount of correlation is Ssub, $$Ssub = Sa - Sb \quad (3)$$

Figure 11A:
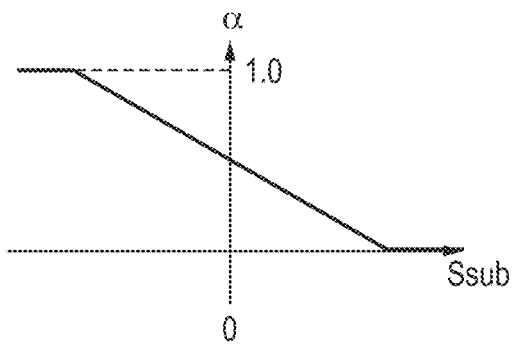
FIGS. 11A to 11D are diagrams showing an exemplary method for combining correction values in the fourth embodiment.

An exemplary relationship between the difference Ssub in the smallest amount of correlation and the combining ratio α is shown in FIG. 11A. Since the correlation between two characteristic pixel sequences is higher as the amount of correlation is smaller as mentioned above, the ratio (combining ratio α) of the correction value Qa computed from the reference line A is made larger as the difference Ssub in the amount of correlation is smaller. Also, the larger the difference Ssub in the amount of correlation is, the combining ratio α is made smaller, and the ratio (1−α) of the correction value Qb computed from the reference line B is made larger.

Figure 11B:
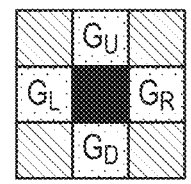

Secondly, determination of the combining ratio α in accordance with a direction detection result with regard to the pixel of interest will be described. Since the present embodiment is particularly effective for a subject having a repetitive shape with an angle close to horizontal, the combining ratio α is determined using a result of detection of the direction of a subject at the periphery of the defective pixel, for example. Although there is no limitation on the method for the direction detection, as an exemplary simple method, a horizontal degree H can be computed as below, assuming that values of pixels adjoining the defective pixel are $G_R$, $G_U$, $G_L$, and $G_D$ as shown in FIG. 11B.

$$H=|G_U-G_D|-|G_L-G_R| \quad (4)$$

A larger value of the horizontal degree H indicates a higher possibility of a horizontal subject. Since this horizontal degree H is obtained from the values of the adjoining pixels of the defective pixel, a larger horizontal degree H indicates a higher possibility that the defective pixel exists in an edge portion of the subject with an angle close to horizontal. Accordingly, when the horizontal degree H is large, it can be considered that the reference line which is more separate from the line of interest is more reliable.

Figure 11C:
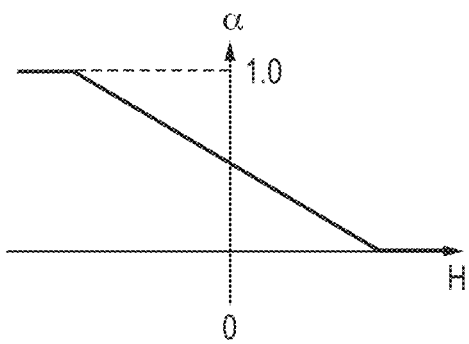

Accordingly, as shown in FIG. 11C, the smaller the horizontal degree H is, the ratio (combining ratio α) of the correction value Qa computed from the closer reference line A is made larger, and the larger the horizontal degree H is, the combining ratio α is made smaller and the ratio (1−α) of the correction value Qb computed from the farther reference line B is made larger.

Thirdly, determination of the combining ratio α in accordance with a difference in the tilt of data between the line of interest and the reference line will be described. For example, when a subject is as shown in FIG. 12A, there are cases where optical characteristics of an area X and an area B in FIG. 12A are similar to each other, whereas optical characteristics of the area X and an area A are different, due to the influence of lens aberration properties or the like.

For example, when the characteristic pixel sequences generated from the line of interest, the reference line A, and the reference line B have pixel values shown in FIG. 12B, the amount of correlation Sx of the characteristic pixel sequence on the reference line A computed by Equation (1) is smaller. However, there are cases where the area A through which the reference line A passes and the area X through which the line of interest passes have different optical characteristics as mentioned above, and in such cases, the correction value obtained with the reference line B may be used.

It can be determined whether or not the optical characteristics are different, based on a difference in the tendency of the change in the pixel value between the characteristic pixel sequences, such as the magnitude of the difference in the tilt of a line connecting pixel values at both ends of the characteristic pixel sequence on each line, for example. For example, in the example in FIG. 12B, the lines connecting pixel values at both ends of the respective characteristic pixel sequences on the line of interest and the reference line B that have similar optical characteristics have a similar tilt. On the other hand, the tilt of a line connecting pixel values at both ends of the characteristic pixel sequence on the reference line A having different optical characteristics is negative, and is greatly different from the tilt obtained with regard to the line of interest. An index G that represents such a difference in the tendency of the change in the pixel values of the characteristic pixel sequences between the line of interest and each reference line can be computed by the following equation, for example.

$$G=(T_{-W}-T_W)-(R_{-W+X}-R_{W+X}) \quad (5)$$

Since the index G represents a difference in the tilt of the line connecting pixel values at both ends of the characteristic pixel sequence, a smaller value indicates that the pixel values of the characteristic pixel sequences of the reference line and the line of interest similarly change. The combining ratio α can be determined in accordance with a difference Gsub=Ga−Gb between an index Ga obtained with regard to the line of interest and the reference line A and an index Gb obtained with regard to the line of interest and the reference line B. Specifically, as shown in FIG. 11D, the smaller the value of Gsub is, the ratio (combining ratio α) of the correction value Qa computed from the reference line A is made larger, and the larger the value of Gsub is, the combining ratio α is made smaller and the ratio (1−α) of the correction value Qb computed from the reference line B is made larger.

Note that, when considering the tendency of the change in pixel values of the characteristic pixel sequence on each line, the amount of correlation may be computed by obtaining a difference in a differential value. In this case, the amount of correlation is obtained from Equation (6) below.

$$S_X = \sum_{i=-W}^{W-1} |(T_{i+1}-T_i)-(R_{i+X+1}-R_{i+X})| \quad (6)$$

Figure 11D:
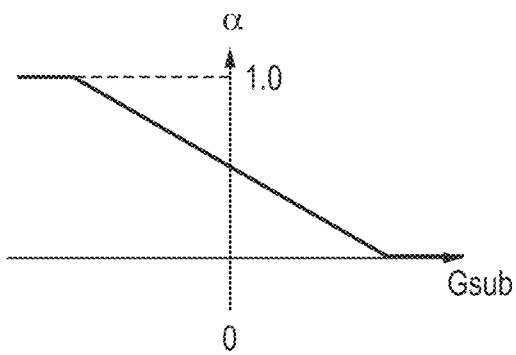

Note that the relationships between the value of the combining ratio α and the value of the respective evaluation criteria shown in FIGS. 11A, 11C, and 11D are merely examples, and the combining ratio α may be determined based on other relationships. The combining ratio α may also be determined based on an evaluation criterion that is different from the aforementioned three evaluation criteria. Also, one of the combining ratios determined based on a plurality of different evaluation criteria may be selected, or a weighted average of such combining ratios may be used. The selection or the weight in this case can be determined in accordance with a feature amount of a subject obtained from an image, or the like.

Although the case of using two reference lines has been described, three or more reference lines may be used. The reference lines may be set not only above the line of interest but also below the line of interest.

As described above, according to the present embodiment, a plurality of reference lines having different distances from the line of interest are set, and the ultimate correction value is obtained from the correction values obtained with regard to the respective reference lines. For this reason, an appropriate reference pixel or correction value can be obtained for various subjects as compared with the case of determining the reference pixel from one reference line, and the defective pixel can be more appropriately corrected.

In particular, even if a subject has an edge in a direction close to the direction of the line of interest or has a repetitive shape, erroneous correction can be suppressed and the accuracy of defective pixel correction can be improved.

Fifth Embodiment

Next, a fifth embodiment will be described. With a method in which the reference pixel is determined based on the correlation between the characteristic pixel sequences on the line of interest and the reference line, a favorable result can be obtained when the reference line is highly correlated with the line of interest. Accordingly, erroneous correction may possibly occur when different subjects appear on the line of interest and on the reference line, such as when a subject appearing on the line of interest ends before reaching the reference line.

Figure 13A:
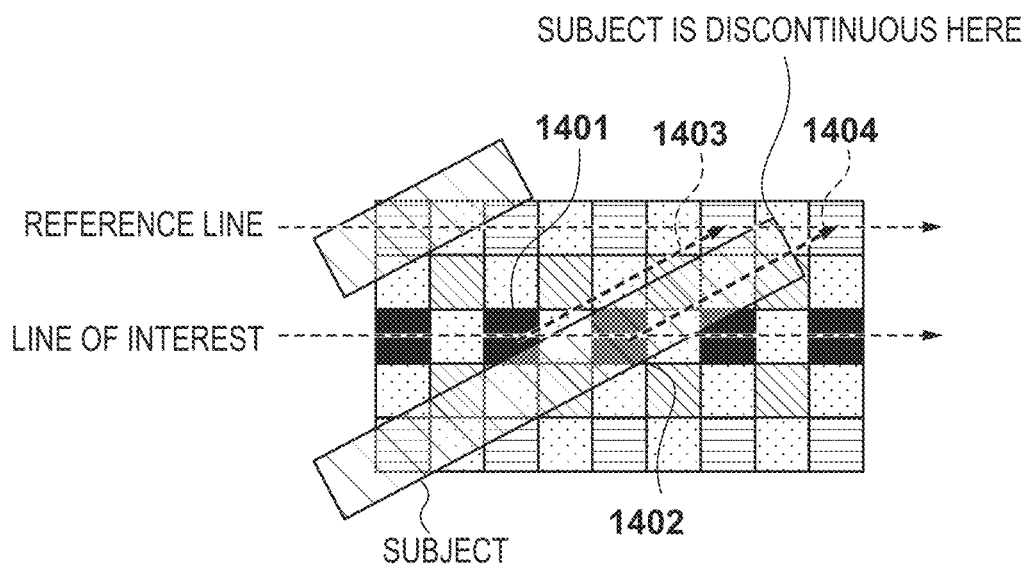
FIGS. 13A and 13B are schematic diagrams for illustrating problems to be handled in a fifth embodiment.

FIG. 13A shows a state where a subject having a specific orientation ends. Here, assume that it is determined, using the first embodiment, that a pixel 1403 on the reference line and a pixel 1404 on the reference line are the reference pixels for the defective pixel 1401 and the defective pixel 1402, respectively. At this time, a subject appearing in the defective pixels 1401 and 1402 appears in the pixel 1403 but does not appear in the pixel 1404 since the subject ends before reaching the pixel 1404. For this reason, there is a possibility that correction of the defective pixel 1401 using the value of the reference pixel 1403 is accurate, whereas correction of the defective pixel 1402 using the value of the reference pixel 1404 is erroneous.

Figure 13B:
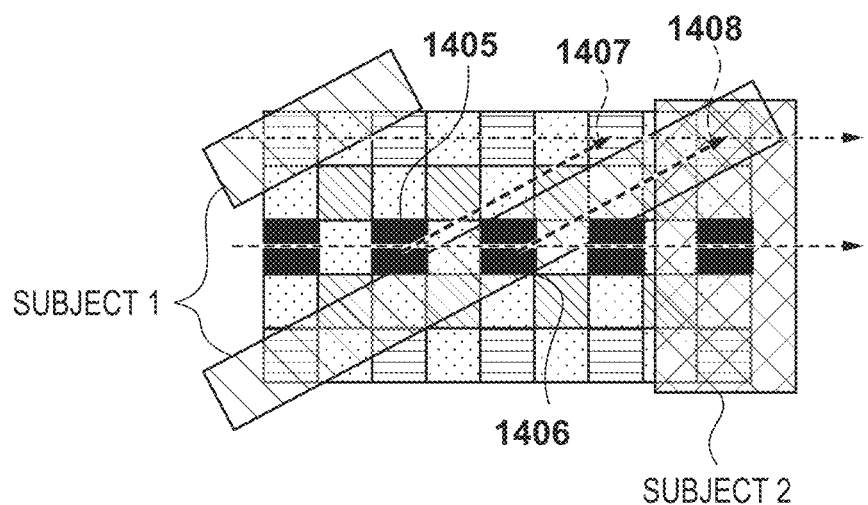

The same problem may possibly occur in the case shown in FIG. 13B as well. FIG. 13B shows a state where a subject 2, which is different from a subject 1 having a specific orientation, lies in the middle of the subject 1. It is assumed that the reference pixels denoted by broken-line arrows in FIG. 13B have been determined, as in FIG. 13A. In this case, correction of the defective pixel 1405 using the reference pixel 1407 is accurate. However, the subject 1, which appears in the defective pixel 1406, as well as the subject 2 appear in the reference pixel 1408, and accordingly there is a possibility that correction of the defective pixel 1406 using the reference pixel 1408 is erroneous.

The present embodiment relates to a correction method for realizing accurate correction even when subjects, the line of interest, and the reference line are in such a positional relationship.

The correction method in the present embodiment is similar to the above-described third embodiment (or first embodiment) except the method for computing the amount of correlation performed in step S305 in FIG. 3, and accordingly the processing for computing the amount of correlation in the present embodiment will be described below in detail.

Figure 14:
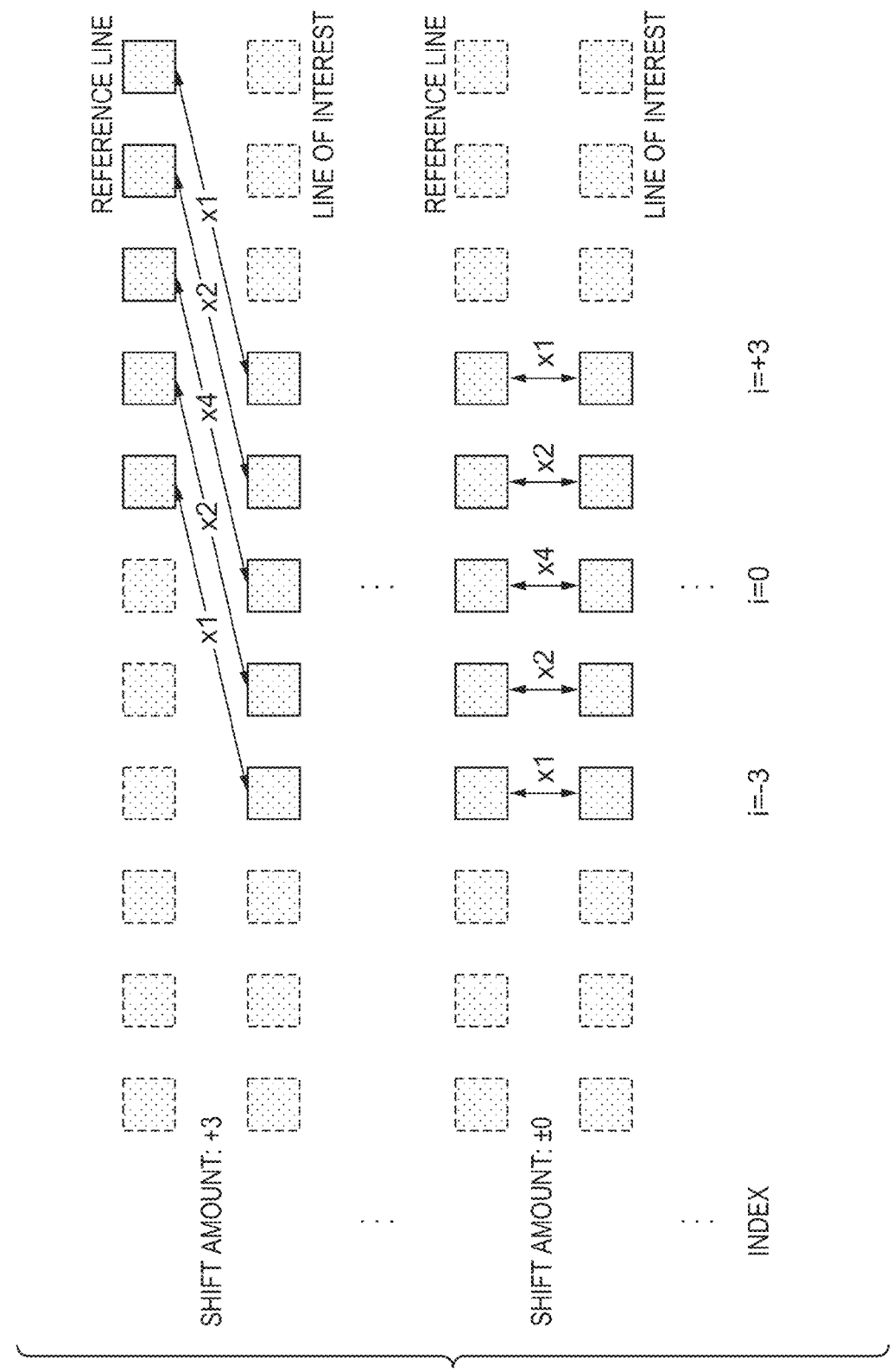
FIG. 14 is a schematic diagram of amount-of-correlation computing processing in the fifth embodiment.

FIG. 14 schematically shows the processing for computing the amount of correlation in the present embodiment. The difference from FIG. 4 that similarly shows the processing for computing the amount of correlation in the first embodiment lies in that a weight corresponding to the distance from the pixel of interest (defective pixel) is applied to a difference value between pixels obtained when computing the amount of correlation. Specifically, the largest weight is applied to the difference in the pixel value with regard to the pixel of interest (defective pixel), and regarding the differences in the pixel value with regard to other pixels, a smaller weight is applied to the difference in the pixel value with regard to a pixel that is more separate from the pixel of interest. The equation for computing the amount of correlation Sx in the present embodiment is as below when the weight at the index i on the line of interest is g(i).

$$S_X = \sum_{i=-W}^{W} \{|T_i - R_{i+X}| * g(i)\} \quad \begin{array}{l} g(i) \geq g(i+1) \quad i \geq 0 \\ g(i) \geq g(i-1) \quad i < 0 \end{array} \quad (7)$$

Figure 5B:
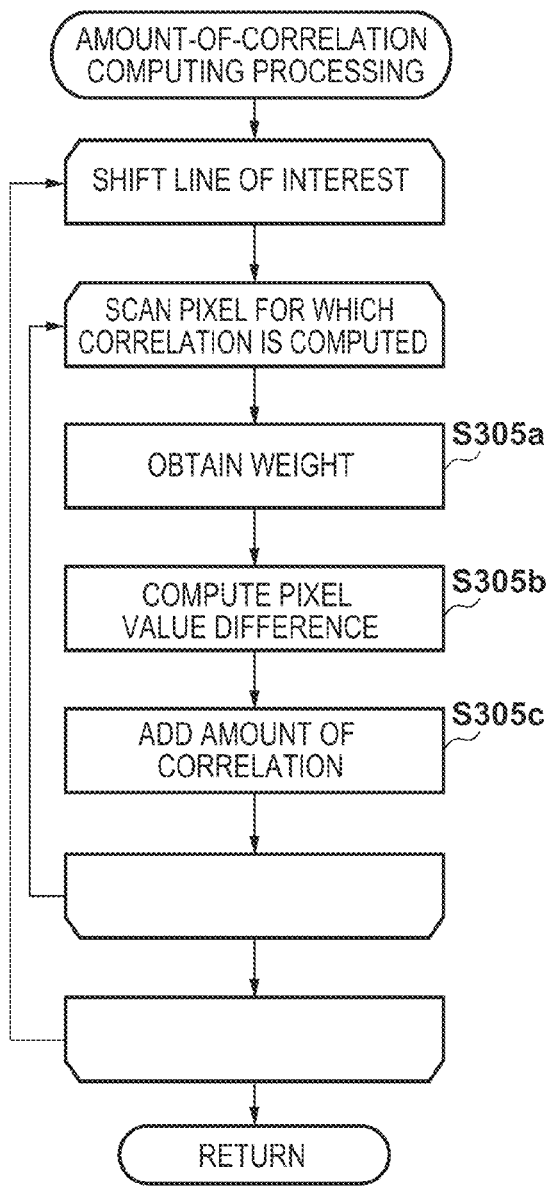

FIG. 5B is a diagram showing a flow of the amount-of-correlation computing processing in the present embodiment. It corresponds to step S305 in the defective pixel correction processing described using FIG. 3, and the CPU 103 computes the amount of correlation with each shift amount by repeating steps S305a to S305c in FIG. 5B.

Initially, in step S305a, the CPU 103 obtains the weight. For example, the weight can be obtained by defining in advance a weight g(i) corresponding to the index i and storing it in the secondary storage device 105, and referencing this weight. Next, in step S305b, the CPU 103 computes a difference in the pixel value corresponding to the shift amount. Specifically, the CPU 103 computes the difference between the pixel values connected by each arrow in FIG. 14, while varying the shift amount. Thereafter, in step S305c, the CPU 103 accumulates, as the amount of correlation, the value obtained by multiplying the difference between the pixel values computed in step S305b by the weight g(i). It is thereby possible to compute the amount of correlation using the weight.

Figure 15A:
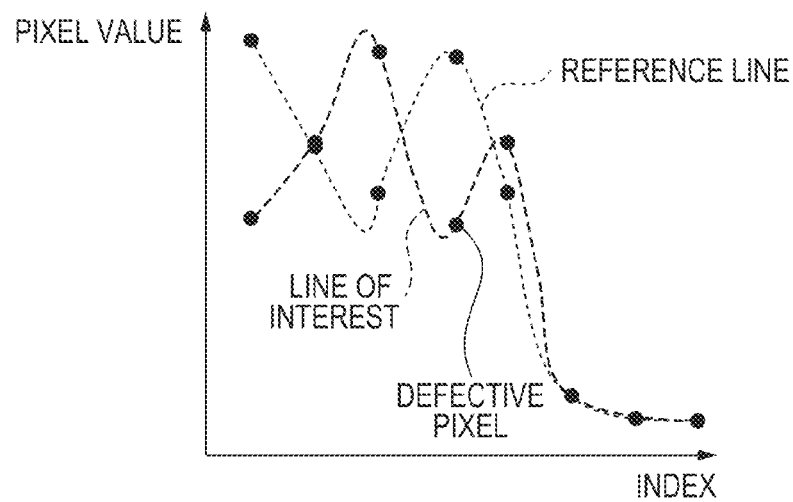
FIGS. 15A to 15C are diagrams for illustrating an effect of the fifth embodiment.
Figure 15B:
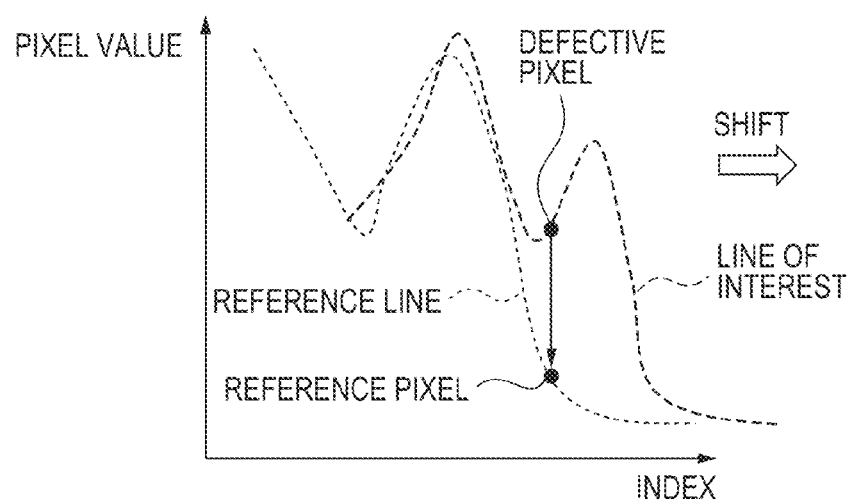
Figure 15C:
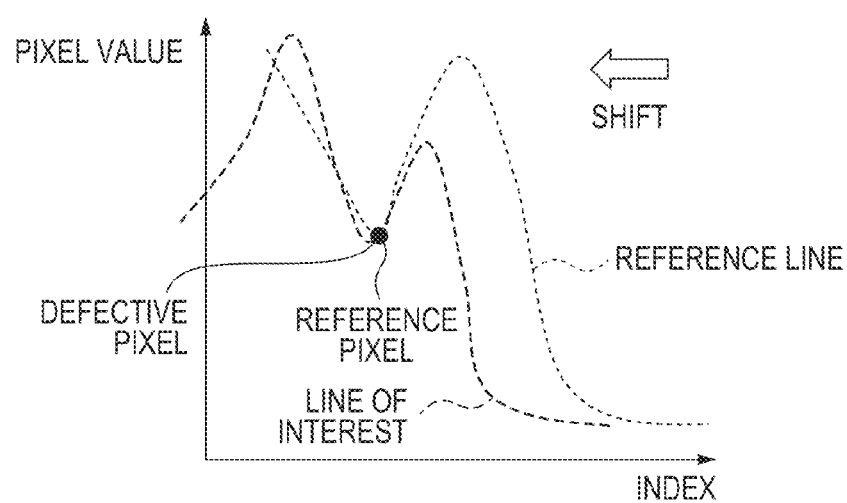

FIGS. 15A to 15C show exemplary effects of use of the amount of correlation Sx in the present embodiment. FIG. 15A shows a relationship between the pixel values in the characteristic pixel sequences on the line of interest and the reference line when the shift amount is 0. Here, based on the amount of correlation Sx obtained by Equation (1) in the first embodiment, the shift amount in the state shown in FIG. 15B is detected as the shift amount with which the correlation is highest.

However, as can be found from FIG. 15B, the difference between two waveforms at the positions of the defective pixel and the reference pixel is rather larger than in the case with no shift. That is to say, although the pixel values of the characteristic pixel sequences are similar to each other as a whole with the shift amount that brings the state in FIG. 15B, the correlation is small in the portions of the defective pixel and the reference pixel.

In contrast, the relationship between the pixels of the characteristic pixel sequences on the line of interest and the reference line is as shown in FIG. 15C with the shift amount detected based on the amount of correlation Sx obtained by Equation (7) that involves weighting for applying a larger weight to the amount of correlation of a pixel closer to the pixel of interest, as in the present embodiment. In this case, the correlation between the characteristic pixel sequences is lower as a whole than in the case in FIG. 15B, whereas the correlation in a portion near the positions of the defective pixel and the reference pixel is higher than in the case in FIG. 15B. Erroneous correction can be thus suppressed for such subjects as those shown in FIGS. 13A and 13B as well by computing the amount of correlation with an emphasis on the correlation in a portion near the defective pixel.

Note that, the weight in the present embodiment is $$g(i) = [x1 \ x2 \ x4 \ x2 \ x1] \quad (8)$$

However, this is merely an example, and other weights may be used. For example, the amount of correlation may be obtained while putting an emphasis on a narrower range by using the following equation:

$$g(i)=[x1\ x1\ x4\ x1\ x1] \quad (9)$$

or while considering a wider range by using the following equation:

$$g(i)=[x1\ x2\ x3\ x4\ x3\ x2\ x1] \quad (10)$$

When putting an emphasis on the correlation in a narrow range around the defective pixel, there is an advantage in that the influence of a portion where a subject ends as shown in FIG. 13A on a result of the detection of the shift amount can be reduced. On the other hand, if pixels in a portion to which a large weight is applied are affected by noise or the like, the accuracy of the detection of the shift amount is likely to decrease. This problem can be reduced by widening the range within which the amount of correlation is computed, but if this range is expanded, the effect of suppressing the influence of the portion where the subject ends on a result of the detection of the shift amount decreases. For this reason, for example, the amount of correlation may be computed using the weight of Equation (10) for an image taken under the condition that the amount of noise is larger, such as in the case of high sensitivity or long-time exposure, and the amount of correlation may be computed using the weight in Equation (9) in the case of an image taken under other conditions or when an edge portion needs to be enhanced.

As described above, according to the present embodiment, when obtaining the amount of correlation, a larger weight is applied to the difference in the pixel value with regard to the defective pixel than to the differences with regard to other pixel values, and it is thereby possible to reduce the influence of the difference in the pixel value at a position separate from the defective pixel on the detected shift amount. For this reason, there is an effect of suppression of erroneous correction even when a subject appearing in the defective pixel is different from a subject appearing in a pixel at a position separate therefrom on the reference line.

Other Embodiment

Although embodiments of the present invention have been described above, the present invention is not limited to these embodiments, and may be modified or changed in various manners within the scope defined in the claims.

Although the above embodiments have described only the case where the line of interest is set in the horizontal direction, it may be set in other directions. For example, if it is detected that the edge of a subject exists near the defective pixel, the line of interest may be set in a direction appropriate for the characteristic of the subject, such as setting the line of interest in a direction intersecting the edge.

Some of the above embodiments may be selectively used or combined in accordance with the condition of taking an image or a result of characteristic analysis.

Although the above embodiments have described correction of an image taken using an image sensor provided with a color filter having a primary color Bayer array, correction can also be similarly performed on an image taken using an image sensor provided with a color filter having other types of repetitive pattern.

Figure 1B:
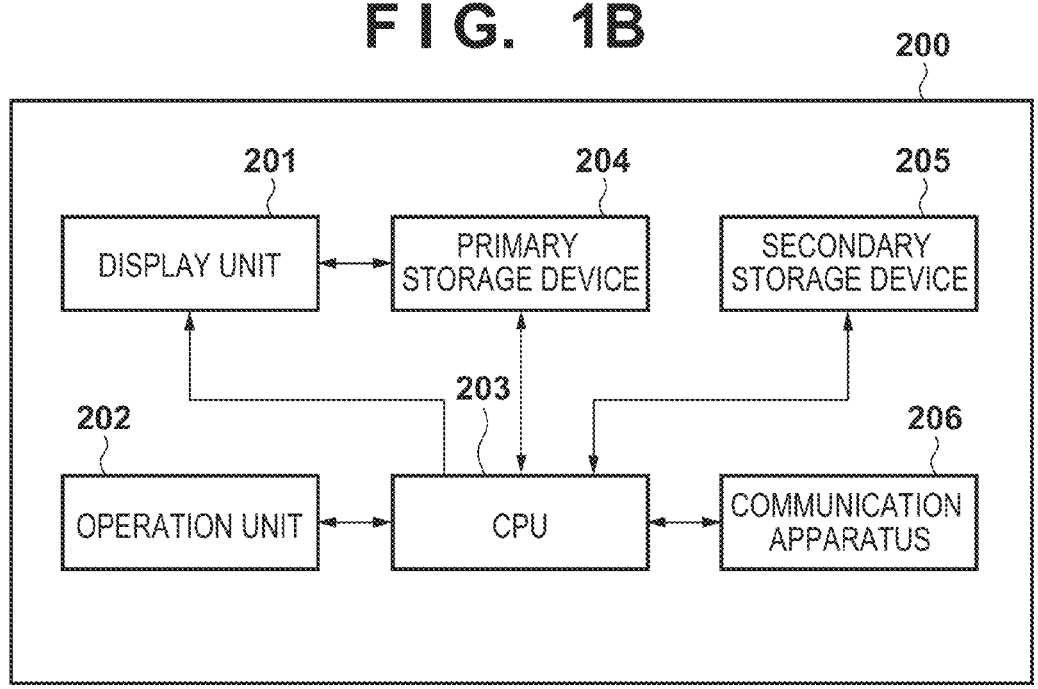

FIG. 1B is a block diagram showing an exemplary functional configuration of an information processing apparatus 200, which serves as an example of another image processing apparatus according to the embodiments. In FIG. 1B, a display unit 201 is used to display a photographic image or display a user interface for an interactive operation. An operation unit 202, which includes, for example, a keyboard, a mouse, a touch pad, or the like, enables the user to give various instructions to the information processing apparatus 200 and configure settings thereof. The CPU 203 realizes the defective pixel correction processing according to the above-described embodiments by executing the OS and application programs and controlling each functional block.

A primary storage device 204 is a volatile storage device such as a RAM, for example, and is used as a temporary data storage area, such as a work area for the CPU 203. A secondary storage device 205 is a nonvolatile storage device such as a hard disk drive, an SSD, or an EEPROM, for example, and stores the OS, firmware, application programs, various setting information, and the like.

A communication apparatus 206 enables the information processing apparatus 200 to transmit and receive control commands and data to/from an external device. Note that, for example, the communication apparatus 206 may communicate with an external device by means of wired connection using a USB (Universal Serial Bus) cable or the like, or may communicate with an external device by means of wireless connection using a wireless LAN or the like. The communication apparatus 206 may be directly connected to an external device, or may be connected via a server or via a network such as the Internet.

The communication apparatus 206 may also include a function of accessing a removable recording medium, such as the storage medium 106 of the image capture apparatus 100. By attaching the recording medium removed from the image capture apparatus to the communication apparatus 206, image data can be loaded into the information processing apparatus 200 from the recording medium.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-37320, filed on Feb. 27, 2014, which is hereby incorporated by reference herein in its entirety.

What is claimed is:

1. An image processing apparatus comprising:
a processor;
a memory storing instructions executable by the processor, wherein the instructions, when executed by the processor, causes the processor to function as:
an obtaining unit configured to obtain an image, wherein the image is obtained with an image sensor in which a plurality of pixels, each of which corresponds to one of a plurality of colors, are arranged in a predetermined arrangement, and a plurality of focus detection pixels are also arranged at consecutive positions for pixels corresponding to a particular color of the plurality of colors in a predetermined pixel line;
a first setting unit configured to set a first area of the image, the first area including a position of a correction target pixel in the predetermined pixel line, wherein the correction target pixel is a focus detection pixel;
a second setting unit configured to set a plurality of second areas of the image, the plurality of the second areas are respectively set based on positions of a plurality of pixels existing in a first reference line, wherein the first reference line is different from the predetermined pixel line and does not include a focus detection pixel;
a correlation computing unit configured to compute amounts of correlation between the respective second areas and the first area; and
a correction unit configured to compute a correction value by using a value of a pixel in the first reference line, the pixel being determined based on the amounts of correlation, and to correct a value of a pixel at the position of the correction target pixel by using the correction value,
wherein the correlation computing unit computes the amounts of correlation while applying a larger weight to a correlation in a portion that is closer to the correction target pixel.

2. The image processing apparatus according to of claim 1,
wherein the first setting unit extracts a pixel corresponding to the particular color and sets the first area using a position of the extracted pixel as the position of the correction target pixel, and the second setting unit extracts the plurality of pixels corresponding to the same color as the pixel extracted by the first setting unit and sets the plurality of second areas using the positions of the extracted pixels.

3. The image processing apparatus according to claim 1,
wherein the first setting unit extracts a pixel corresponding to a color that is different from the particular color and sets the first area using a position of the extracted pixel as the position of the correction target pixel, and the second setting unit extracts the plurality of pixels corresponding to the same color as the pixel extracted by the first setting unit and sets the plurality of second areas using the positions of the extracted pixels.

4. The image processing apparatus according to claim 1,
wherein the distance between the first reference line and the predetermined pixel line is equal to a multiple of a repetition unit of a color filter provided in an image sensor that generates the image.

5. The image processing apparatus according to claim 1, further comprising:
a third setting unit configured to set a plurality of third areas of the image, each third area is set based on positions of a plurality of pixels existing a second reference line, wherein the predetermined pixel line is between the first and second reference lines and the second reference line does not include a focus detection pixel,
wherein the correlation computing unit further configured to compute amounts of correlation between the respective third areas and the first area, and
wherein the correction unit compute the correction value by using the value of the pixel in the first reference line and a value of a pixel in the second reference line, the pixel on the second reference line being determined based on the amounts of correlation between the respective third areas and the first area.

6. The image processing apparatus according to claim 1,
wherein the correction unit computes the correction value by using a value of a pixel in the first line, the pixel being determined based on one of the plurality of second areas in which a highest correlation with the first area is obtained, among the plurality of second areas.

7. The image processing apparatus according to claim 6,
wherein, if a plurality of second areas exists in which the highest correlation with the first area is obtained, the correction unit computes the correction value by using a value of a pixel in the first reference line whose distance from the position of the correction target pixel is shortest among a plurality of pixels in the first reference line respectively determined by the plurality of second areas in which the highest correlation with the first area is obtained.

8. The image processing apparatus according to claim 1,
wherein the second setting unit sets the plurality of second areas for each of a plurality of the first reference lines having different distances from the predetermined pixel line.

9. The image processing apparatus according to claim 8,
wherein the correction unit computes a plurality of correction values by using a value of a pixel existing in en each of the plurality of the first reference lines, combines the plurality of correction values, and computes an ultimate correction value.

10. The image processing apparatus according to claim 9,
wherein the correction unit combines the plurality of correction values such that a ratio of a correction value obtained using a pixel value determined based on an amount of correlation of a second area having a tendency of change in a pixel value with a smaller difference from that of the first area, among the amounts of correlation of the respective second areas with the first area, is larger.

11. The image processing apparatus according to claim 9,
wherein the correction unit combines the plurality of correction values such that a ratio of a correction value obtained using a pixel value determined based on an amount of correlation which represents a higher correlation, among the amounts of correlation of the respective second areas with the first area, is larger.

12. The image processing apparatus according to claim 11,
wherein the correction unit combines the plurality of correction values such that, the closer the direction of a subject appearing in the correction target pixel is to the direction of the predetermined pixel line, a ratio of a correction value obtained using a pixel value determined based on an amount of correlation computed with regard to a second area that is generated based on the first reference line having a larger distance from the predetermined pixel line, is larger.

13. A method for controlling the image processing apparatus, the method comprising:
   obtaining an image, wherein the image is obtained with an image sensor in which a plurality of pixels, each of which corresponds to one of a plurality of colors, are arranged in a predetermined arrangement, and a plurality of focus detection pixels are also arranged at consecutive positions for pixels corresponding to a particular color of the plurality of colors in a predetermined pixel line;
   setting a first area of the image, the first area including a position of a correction target pixel in the predetermined pixel line, wherein the correction target pixel is a focus detection pixel;
   setting a plurality of second areas of the image, the plurality of the second areas are respectively set based on positions of a plurality of pixels existing in a first reference line, wherein the first reference line is different from the predetermined pixel line and does not include a focus detection pixel;
   computing amounts of correlation between the respective second areas and the first area;
   computing a correction value by using a value of a pixel in the first reference lines, the pixel being determined based on the amounts of correlation; and
   correcting a value of a pixel at the position of the correction target pixel by using the correction value,
   wherein, in the computing the amounts of correlation, the amounts of correlation are computed while applying a larger weight to a correlation in a portion that is closer to the correction target pixel.

14. A non-transitory computer-readable storage medium storing a program for causing, when executed by a computer, the computer to function as the image processing apparatus comprising:
   an obtaining unit configured to obtain an image, wherein the image is obtained with an image sensor in which a plurality of pixels, each of which corresponds to one of a plurality of colors, are arranged in a predetermined arrangement, and a plurality of focus detection pixels are also arranged at consecutive positions for pixels corresponding to a particular color of the plurality of colors in a predetermined pixel line;
   a first setting unit configured to set a first area of the image, the first area including a position of a correction target pixel in the predetermined pixel line, wherein the correction target pixel is a focus detection pixel;
   a second setting unit configured to set a plurality of second areas of the image, the plurality of the second areas are respectively set based on positions of a plurality of pixels existing in a first reference line, wherein the first reference line is different from the predetermined pixel line and does not include a focus detection pixel;
   a correlation computing unit configured to compute amounts of correlation between the respective second areas and the first area; and
   a correction unit configured to compute a correction value by using a value of a pixel in the first reference line, the pixel being determined based on the amounts of correlation, and to correct a value of a pixel at the position of the correction target pixel by using the correction value,
   wherein the correlation computing unit computes the amounts of correlation while applying a larger weight to a correlation in a portion that is closer to the correction target pixel.

* * * * *